US008576305B2

(12) United States Patent
Kinoshita

(10) Patent No.: US 8,576,305 B2
(45) Date of Patent: Nov. 5, 2013

(54) IMAGE PICKUP APPARATUS AND METHOD OF CORRECTING CAPTURED IMAGE DATA

(75) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 567 days.

(21) Appl. No.: 12/042,154

(22) Filed: Mar. 4, 2008

(65) Prior Publication Data
US 2008/0284889 A1 Nov. 20, 2008

(30) Foreign Application Priority Data
May 15, 2007 (JP) ................................. 2007-128852

(51) Int. Cl.
H04N 5/217 (2011.01)
H04N 9/64 (2006.01)

(52) U.S. Cl.
USPC .......................................... 348/241; 348/245

(58) Field of Classification Search
USPC .................... 348/241, 243, 245, 247
See application file for complete search history.

(56) References Cited

U.S. PATENT DOCUMENTS

| 5,329,111 A | 7/1994 | Sonoda et al. | |
| 5,592,310 A * | 1/1997 | Sugiura | 358/501 |
| 6,956,605 B1 | 10/2005 | Hashimoto | |
| 7,084,912 B2 * | 8/2006 | Chieh | 348/245 |
| 7,304,670 B1 * | 12/2007 | Hussey et al. | 348/241 |
| 7,830,437 B2 * | 11/2010 | McKee et al. | 348/302 |
| 2002/0140830 A1 * | 10/2002 | Shirakawa et al. | 348/245 |
| 2003/0202111 A1 | 10/2003 | Park | |
| 2004/0239782 A1 * | 12/2004 | Equitz et al. | 348/246 |
| 2005/0243193 A1 * | 11/2005 | Gove et al. | 348/241 |
| 2006/0038904 A1 * | 2/2006 | Kudoh | 348/308 |

FOREIGN PATENT DOCUMENTS

| JP | 2004-172950 | 6/2004 |
| JP | 2005-110104 | 4/2005 |
| JP | 2006-73733 | 3/2006 |
| JP | 2006-157953 | 6/2006 |
| JP | 3838665 | 8/2006 |
| WO | WO 2006/113489 A1 | 10/2006 |

* cited by examiner

Primary Examiner — Albert Cutler
(74) Attorney, Agent, or Firm — Oblon, Spivak, McClelland, Maier & Neustadt, L.L.P.

(57) ABSTRACT

An image pickup apparatus includes a solid-state image pickup device including a plurality of pixels arranged in a two-dimensional array, a circuit necessary for the pixel structure being shared between the pixels of a predetermined number having the same arrangement pattern; correction value generating means for generating a correction value for the pixel data read out from the pixel position of each pixel having the same arrangement pattern, the correction value being used for correcting the nonuniformity in pixel characteristics caused by a difference in position between the pixels in the arrangement pattern; and correcting means for correcting each pixel data read out from the solid-state image pickup device on the basis of the correction value for the corresponding pixel data, generated by the correction value generating means.

7 Claims, 16 Drawing Sheets

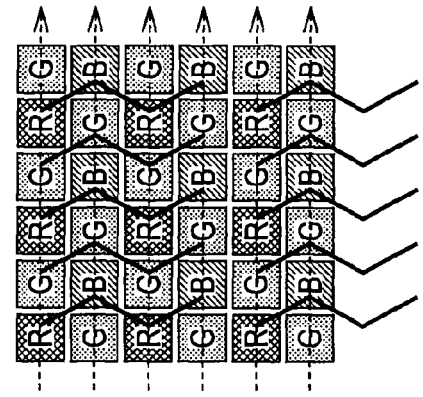
FIG. 4A
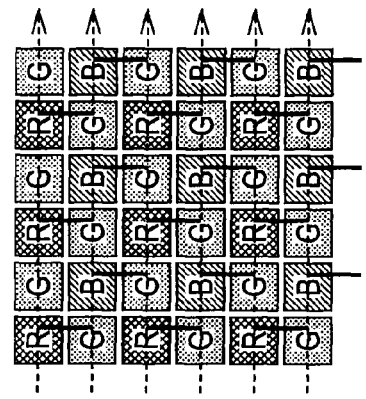
FIG. 4B
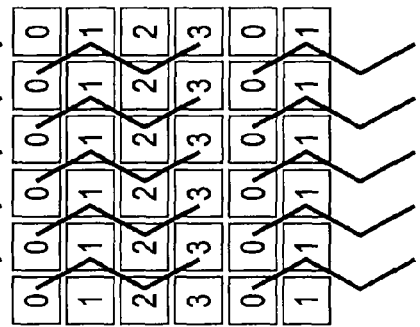
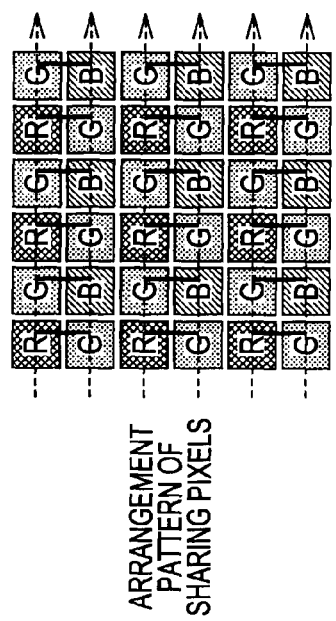
FIG. 4C

INTi

IMAGE PICKUP APPARATUS AND METHOD OF CORRECTING CAPTURED IMAGE DATA

CROSS REFERENCES TO RELATED APPLICATIONS

The present invention contains subject matter related to Japanese Patent Application JP 2007-128852 filed in the Japanese Patent Office on May 15, 2007, the entire contents of which are incorporated herein by reference.

BACKGROUND OF THE INVENTION

1. Field of the Invention

The present invention relates to an image pickup apparatus including a solid-state image pickup device, such as a complementary metal oxide semiconductor (CMOS) imager, and to a method of correcting image data captured by the image pickup apparatus.

2. Description of the Related Art

In recent years, there is an increasing need for solid-state image pickup devices, such as charge coupled device (CCD) imagers and CMOS imagers, used in video cameras and digital still cameras to increase the number of pixels and to reduce in size. The increase in the number of pixels along with the reduction in size causes the area per pixel to be decreased, thus possibly lowering the pixel sensitivity.

In order to resolve such a problem, the proportion of photodiodes in the pixel structure of the solid-state image pickup devices, which includes the photodiodes and a peripheral circuit including amplifier transistors and reset transistors, has been increased as much as possible by devising the circuitry and the wiring layout and/or developing the manufacturing processes to achieve both the increase in the number of pixels and the reduction in size.

However, the recent demand for the solid-state image pickup devices to increase the number of pixels and to reduce in size is increasing and, at the same time, an improvement in the image quality at lower illumination draws attention. Accordingly, it may not be possible to provide the solid-state image pickup devices capable of achieving the pixel sensitivity that ensures a desirable image quality only by the above action.

In these situations, pixel sharing technologies receive widespread attention in order to overcome the above drawback of the solid-state image pickup devices. In the pixel sharing technologies, part of the circuits necessary for the pixel structure, for example, the amplified transistors and/or the reset transistors, are shared between multiple pixels that are horizontally and/or vertically adjacent or near to each other to reduce the circuit area (including the wiring) of each pixel and to increase the proportion of the photodiode by the amount corresponding to the reduction in the area, thereby improving the pixel sensitivity.

For example, Japanese Patent Application No. 3838665 discloses a pixel sharing technology of sharing the amplified transistor and the reset transistor necessary to read out pixel data from each pixel between two adjacent pixels. In this technology, the pixel data is read out from each pixel while the two adjacent pixels connected to the amplified transistor and the reset transistor are sequentially selected at slightly different times to decrease the number of transistors per pixel and to increase the area for the photodiodes by the amount corresponding to the decrease in the number of transistors in order to improve the pixel sensitivity.

In general solid-state image pickup devices that do not adopt the pixel sharing technology, all the pixels are normally configured uniformly. In other words, the pixel structure of the general solid-state image pickup devices is always common to the pixels at any positions on the screen. Accordingly, the photodiodes of all the pixels have the same peripheral environment in the semiconductor structure in such general solid-state image pickup devices. Consequently, the optical characteristics are basically common to all the pixels if the factor of a variation in the manufacturing is excluded.

However, in the solid-state image pickup devices to which the "pixel sharing technology" is applied and which is disclosed in, for example, Japanese Patent Application No. 3838665, all the pixels have the same structure when the multiple pixels that share the circuit and that are adjacent or near to each other are considered as one unit. However, the pixels arranged at different positions in the unit have different peripheral environments in the semiconductor structure. Accordingly, in the solid-state image pickup devices adopting the pixel sharing technology, the arrangement pattern of the multiple pixels sharing the circuit is repeated to form the circuit layout.

Specifically, when the multiple pixels sharing the circuit are considered as one unit, the multiple units are repetitively arranged horizontally and vertically in the solid-state image pickup devices. Since the photodiodes of the pixels arranged at the same position in the arrangement patterns of the pixels in the multiple units have the same peripheral environment in the semiconductor structure, the pixels have the same optical characteristics.

However, since the pixels arranged at different positions in the arrangement patterns of the multiple pixels sharing the circuit, that is, the pixels that are adjacent or near to each other in the units have different circuitries and/or layouts, the photodiodes of the pixels have different peripheral environments in the semiconductor structure, thus providing different pixel characteristics.

Accordingly, even if images of fully uniform subjects are captured with the solid-state image pickup devices to which the "pixel sharing technology" is applied, different values are output from the adjacent pixels in one unit and, therefore, there is a problem in that the quality of the finally output images may be greatly dropped.

In related art, in order to avoid the above problems involved in the pixel sharing, technologies of devising the pixel structure of the solid-state image pickup devices are disclosed in, for example, Japanese Unexamined Patent Application Publication No. 2004-172950, Japanese Unexamined Patent Application Publication No. 2005-110104, Japanese Unexamined Patent Application Publication No. 2005-73733, and Japanese Unexamined Patent Application Publication No. 2006-157953. In such technologies, for example, (A) the pixel layout is devised to reduce the optical nonuniformity as much as possible or (B) the pixel sharing is performed so as not to adversely affect the output images even if the optical nonuniformity occurs.

SUMMARY OF THE INVENTION

As described above, the pixel structure of the solid-state image pickup devices is devised in the technologies disclosed in the above-mentioned documents.

However, with the method (A), it may not be possible to eliminate the optical nonuniformity between the multiple pixels sharing a circuit (the multiple pixels sharing a circuit are hereinafter referred to as "sharing pixels") even if the optical nonuniformity can be reduced.

In both the method (A) and the method (B), severe restrictions can be imposed on the pixel structure, the layout, or the readout of the pixel data. In addition, severe restriction can be imposed on the entire image pickup apparatuses processing the outputs from the solid-state image pickup devices to which the method (A) or (B) is applied.

In order to resolve the above problems, it is desirable to provide an image pickup apparatus capable of correcting captured image data supplied from the solid-state image pickup device, instead of devising the pixel structure of the solid-state image pickup device, to reduce the nonuniformity in pixel characteristics of the sharing pixels.

According to an embodiment of the present invention, an image pickup apparatus includes a solid-state image pickup device including a plurality of pixels arranged in a two-dimensional array, a circuit necessary for the pixel structure being shared between the pixels of a predetermined number having the same arrangement pattern; correction value generating means for generating a correction value for the pixel data read out from the pixel position of each pixel having the same arrangement pattern, the correction value being used for correcting the nonuniformity in pixel characteristics caused by a difference in position between the pixels in the arrangement pattern; and correcting means for correcting each pixel data read out from the solid-state image pickup device on the basis of the correction value for the corresponding pixel data, generated by the correction value generating means.

According to another embodiment of the present invention, an image pickup apparatus includes a solid-state image pickup device including a plurality of pixels arranged in a two-dimensional array, a circuit necessary for the pixel structure being shared between the pixels of a predetermined number having the same arrangement pattern; black level generating means for generating a black level of the pixel data read out from the pixel position of each pixel having the same arrangement pattern by using the pixel data read out from the pixels corresponding to an area where the black level is detected, the different pixel positions in the arrangement pattern having different black levels; and clamping means for performing digital clamping to each pixel data read out from the solid-state image pickup device on the basis of the black level generated by the black level generating means.

According to another embodiment of the present invention, an image pickup apparatus includes a solid-state image pickup device including a plurality of pixels arranged in a two-dimensional array, a circuit necessary for the pixel structure being shared between the pixels of a predetermined number having the same arrangement pattern; storing means for storing a correction value generated from the pixel data read out from the solid-state image pickup device when an image of a uniform subject is captured for every pixel position in the arrangement pattern, the correction value being used for correcting a difference in output level between the pixel positions in the arrangement pattern; and correcting means for correcting each pixel data read out from the solid-state image pickup device on the basis of the correction value for the corresponding pixel data, supplied from the storing means.

According to another embodiment of the present invention, a method of correcting captured image data read out from a solid-state image pickup device including a plurality of pixels arranged in a two-dimensional array, a circuit necessary for the pixel structure being shared between the pixels of a predetermined number having the same arrangement pattern includes the steps of generating a correction value for the pixel data read out from the pixel position of each pixel having the same arrangement pattern, the correction value being used for correcting the nonuniformity in pixel characteristics caused by a difference in position between the pixels in the arrangement pattern; and correcting each pixel data read out from the solid-state image pickup device on the basis of the generated correction value for the corresponding pixel data.

In the image pickup apparatus having any of the configuration described above, multiple pixels of a predetermined number having the same arrangement pattern are used as sharing pixels. The correction value generating means generates the correction value used for correcting the nonuniformity in pixel characteristics caused by a difference in position between the pixels in the arrangement pattern for the pixel data read out from the pixel position of each pixel having the same arrangement pattern.

The correcting means corrects the nonuniformity in pixel characteristics between the pieces of data read out from the solid-state image pickup device by using the correction value for the pixel data read out from the pixel position of each pixel having the same arrangement pattern, generated by the correction value generating means.

According to the present invention, it is possible to reduce the nonuniformity in pixel characteristics between the sharing pixels in the captured image data supplied from the solid-state image pickup device.

BRIEF DESCRIPTION OF THE DRAWINGS

FIGS. 4A to 4C illustrate examples of the arrangement patterns of sharing pixels and the sharing pixel IDs in the solid-state image pickup device used in the image pickup apparatus according to the first embodiment of the present invention;

DESCRIPTION OF THE PREFERRED EMBODIMENTS

Embodiments of the present invention will herein be described with reference to the attached drawings.

First Embodiment

Figure 1:
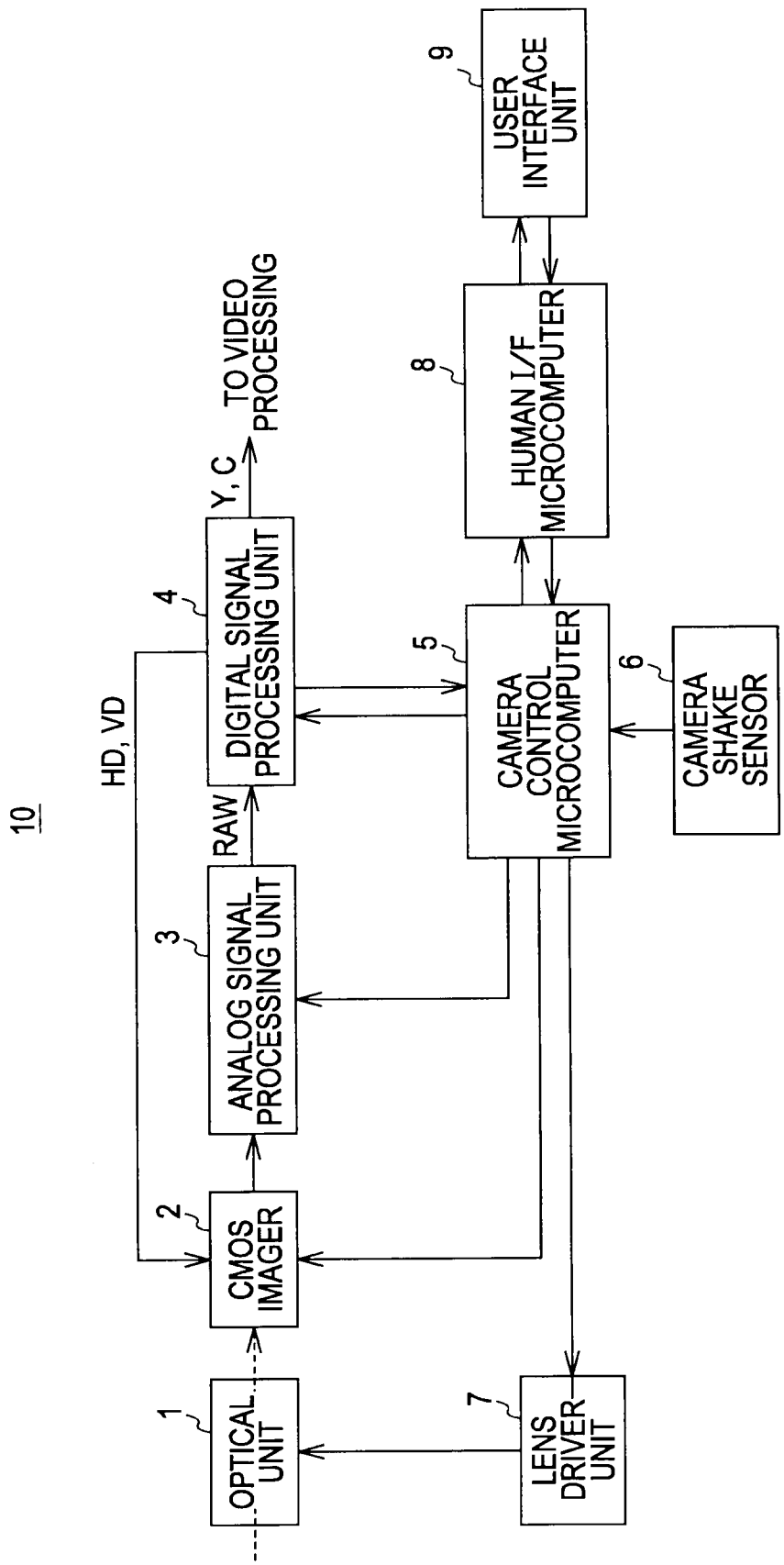
FIG. 1 is a block diagram showing an example of the configuration of an image pickup apparatus according to a first embodiment of the present invention.

FIG. 1 is a block diagram showing an example of the configuration of an image pickup apparatus 10 according to a first embodiment of the present invention. The image pickup apparatus 10 includes an optical unit 1 including a lens, a CMOS imager 2 by which a solid-state image pickup device is exemplified, an analog signal processing unit 3, a digital signal processing unit 4, a camera control microcomputer 5, a camera shake sensor 6, a lens driver unit 7, a human interface microcomputer 8, and a user interface unit 9.

The optical unit 1 is provided with an actuator that adjusts the position of the lens in order to correct camera shaking. The actuator is driven and controlled by a lens drive signal supplied from the lens driver unit 7.

The CMOS imager 2 has many pixels horizontally and vertically arranged therein. The pixel sharing technology is applied to the CMOS imager 2. The CMOS imager 2 also has color filters arranged at the side on which light is incident in order to generate color images.

Figure 2B:
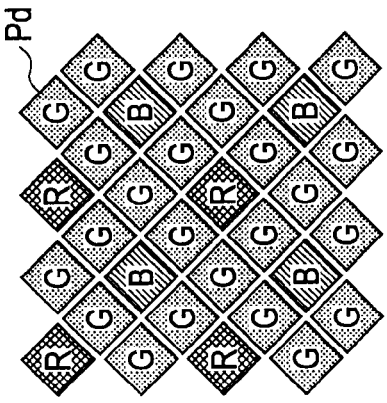
FIGS. 2A to 2E illustrate exemplary pixel arrays and color filter arrays in a solid-state image pickup device used in the image pickup apparatus according to the first embodiment of the present invention.
Figure 2C:
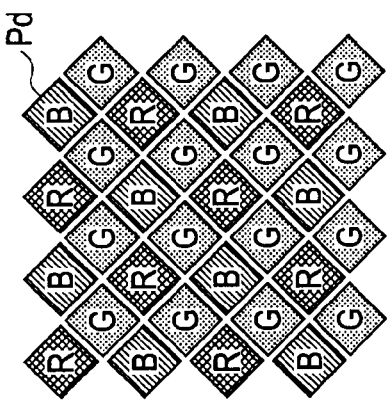
Figure 2A:
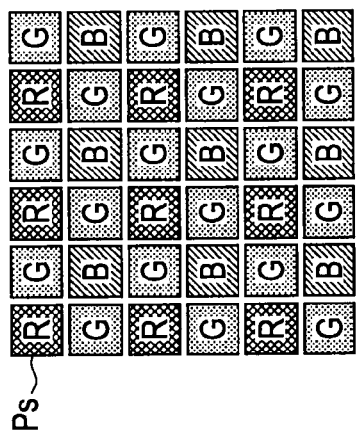

FIGS. 2A to 2E illustrate exemplary pixel arrays and color filter arrays in the CMOS imager 2. FIG. 2A illustrates a so-called Bayer array. In the Bayer array in FIG. 2A, many square pixels Ps are horizontally and vertically arranged. The color filters of red R and green G are alternately arranged so as to oppose the pixels for every two horizontal rows while the color filters of blue B and green G are alternately arranged so as to oppose the pixels in the remaining horizontal rows. In addition, the pixels having the color filters of red R are arranged so as not to be included in the same vertical columns in which the pixels having the color filters of blue B are arranged.

In the pixel arrays in FIGS. 2B and 2C, many diamond-shaped pixels Pd are horizontally and vertically arranged. In these pixel arrays, it is possible to set the apparent horizontal and vertical pixel pitch to a value lower than that in the Bayer array. However, the array of the color filters in FIG. 2B is different from that of the color filters in FIG. 2C.

Specifically, in the pixel array in FIG. 2B, the color filters of red R and blue B are alternately arranged so as to oppose the pixels for every two horizontal rows, and the color filters of red R and blue B are also alternately arranged so as to oppose the pixels for every two vertical columns. Only the color filters of green G are arranged so as to oppose the pixels in the remaining horizontal rows and vertical columns.

In the pixel array in FIG. 2C, the color filters of red R and green G are alternately arranged so as to oppose the pixels for every four horizontal rows, and the color filters of blue B and green G are also alternately arranged so as to oppose the pixels for every other four horizontal rows. Only the color filters of green G are arranged so as to oppose the pixels in the remaining horizontal rows. The pixels having the color filters of red R are arranged so as not to be included in the same vertical columns in which the pixels having the color filters of blue B are arranged.

Figure 2E:
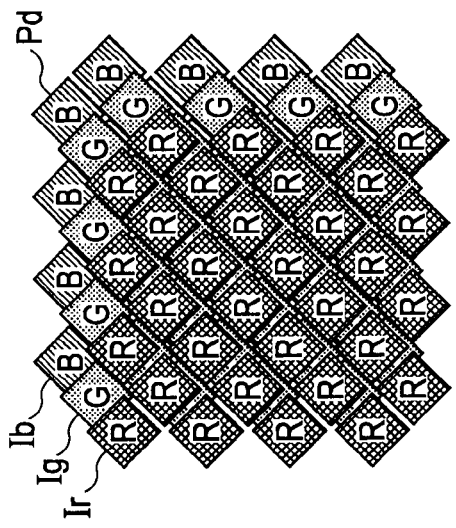
Figure 2D:
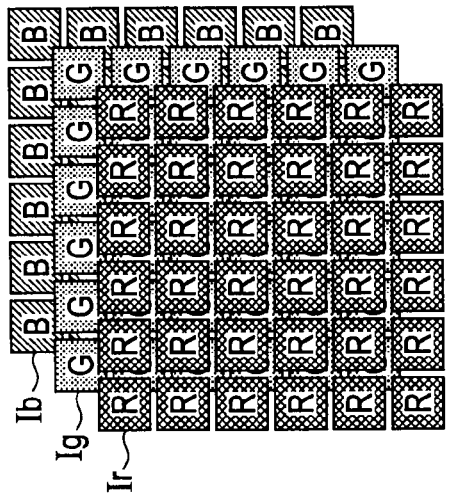

Although the exemplary arrays of the single-plate solid-state image pickup devices are shown in FIGS. 2A to 2C, the solid-state image pickup devices may have a three-plate structure in FIG. 2D or 2E, in which a solid-state image pickup device Ir is provided for red R, a solid-state image pickup device Ig is provided for green G, and a solid-state image pickup device Ib is provided for blue B. The solid-state image pickup devices Ir, Ig, and Ib in FIG. 2D each have many square pixels horizontally and vertically arranged thereon, as in the pixel array in FIG. 2A. The solid-state image pickup devices Ir, Ig, and Ib in FIG. 2E each have many diamond-shaped pixels horizontally and vertically arranged thereon, as in the pixel arrays in FIGS. 2B and 2C.

The CMOS imager 2 in FIG. 1 may have any of the pixel arrays in FIGS. 2A to 2E. According to the present embodiment, it is assumed that the CMOS imager 2 has the Bayer array in FIG. 2A for simplicity.

It is also assumed that the output from the CMOS imager 2 is transferred through one channel. Pixel data is read out from the CMOS imager 2 through one channel in a manner shown in FIG. 3. Specifically, the pixel data is read out from the multiple pixels Ps in the CMOS imager 2 for every row from left to right through one channel to scan the pixel array to the end of the row. After all the pixel data in one horizontal row has been read out, the pixel data is read out from the next row. Similarly, the pixel array is horizontally scanned in parallel to read out the pixel data from the entire screen.

In other words, the pixels are read out from the CMOS imager 2 in the order in which the pixel array is horizontally scanned.

Figure 3:
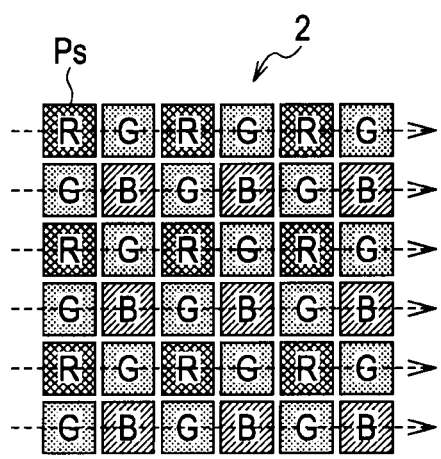
FIG. 3 illustrates how to read out captured image data from the solid-state image pickup device used in the image pickup apparatus according to the first embodiment of the present invention.

Although the CMOS imager is generally suitable not only for the one-channel readout but also for multi-channel parallel readout, the present invention does not depend on such readout methods. Although the readout sequence shown in FIG. 3 is exemplified in the first embodiment of the present invention for convenience, the present invention is not limited to this readout method. The embodiments of the present invention may be applied to another readout method.

The CMOS imager 2 according to the present embodiment has the pixel structure to which the pixel sharing technology described above is applied. FIGS. 4A to 4C illustrate three exemplary arrangement patterns of sharing pixels.

The arrangement patterns of the sharing pixels in the CMOS imager 2 are shown in the upper lines in FIGS. 4A to 4C. Multiple pixels connected with bold lines represent the sharing pixels.

The identification (hereinafter referred to as the sharing pixel ID) at each pixel position in the arrangement pattern of the sharing pixels is shown in the medium lines in FIGS. 4A to 4C.

The sequences of the pixels output from the CMOS imager 2, represented by the sharing pixel IDs, are shown in the lower lines in FIGS. 4A to 4C. The output sequences of the sharing pixel IDs illustrated in the lower lines focus attention only on the arrangement patterns of the sharing pixels and the color filters corresponding to the pixels are not considered in the examples in FIGS. 4A to 4C.

FIG. 4A illustrates a case in which the respective two adjacent vertical pixels are processed as the sharing pixels. Specifically, the respective two pixels on the adjacent horizontal rows are processed as the sharing pixels. Accordingly, "0" and "1" alternately appear for every horizontal row as the sharing pixel IDs, as shown in the medium line. All the pixels in one horizontal row in the pixel output sequence have the sharing pixel ID "0" and all the pixels in the next horizontal row in the pixel output sequence have the sharing pixel ID "1", as shown in the lower line.

FIG. 4B also illustrates the case in which the respective two adjacent vertical pixels are processed as the sharing pixels. However, in the arrangement pattern in FIG. 4B, a pair of the sharing pixels is shifted from the next pair of the sharing pixels by one vertical pixel. Accordingly, "0" and "1" alternately appear in each horizontal row as the sharing pixel IDs, and the appearance order of "0" and "1" in one horizontal row is reverse of that in the next horizontal row, as shown in the medium line. Similarly, "0" and "1" alternately appear in each horizontal row in the pixel output sequence as the sharing pixel IDs, and the appearance order of "0" and "1" in one horizontal row is reverse of that in the next horizontal row, as shown in the lower line.

FIG. 4C illustrates a case in which four vertical pixels arranged in a zig-zag manner are processed as the sharing pixels. Accordingly, "0"s, "1"s, "2"s, and "3"s alternately appear for every four horizontal rows as the sharing pixel IDs, as shown in the medium line. Similarly, "0"s, "1"s, "2"s, and "3"s alternately appear for every four horizontal rows in the pixel output sequence as the sharing pixel IDs, as shown in the lower line.

Any of the arrangement patterns of the sharing pixels shown in FIGS. 4A to 4C may be adopted in the CMOS imager 2 according to the first embodiment of the present invention. It is assumed that the CMOS imager 2 has the arrangement pattern of the sharing pixels shown in FIG. 4A.

Referring back to FIG. 1, light incident on the optical unit 1 is subjected to photoelectric conversion in the CMOS imager 2 having the above configuration and is output as an electrical signal, that is, captured image data. The CMOS imager 2 starts or stops readout of pixel data and controls the readout position in response to a control signal supplied from the camera control microcomputer 5.

The image data output from the CMOS imager 2 through one channel is supplied to the analog signal processing unit 3 where the image data is subjected to, for example, a sample hold operation and automatic gain control. The image data is, then, subjected to analog-to-digital (A/D) conversion in the analog signal processing unit 3 and the digital signal is supplied to the digital signal processing unit 4.

Although the analog signal output from the CMOS imager 2 is subjected to the sample hold operation, the automatic gain control, and the A/D conversion in the analog signal processing unit 3 in the above description, the configuration of the analog signal processing unit 3 may be incorporated in the CMOS imager 2.

The digital signal processing unit 4 performs a variety of signal processing to the captured image data RAW (raw data) supplied from the analog signal processing unit 3 in response to an instruction from the camera control microcomputer 5. The variety of signal processing performed in the digital signal processing unit 4 includes so-called camera signal processing, such as white balancing, gamma correction, and color difference signal processing, and arithmetic processing for camera control detection data (data about captured images on the screen, such as brightness, contrast, and hue).

The digital signal processing unit 4 includes a reference timing signal generating part, as described below, which generates various timing signals. The timing signals include a horizontal synchronization signal HD and a vertical synchronization signal VD for the captured image data. The digital signal processing unit 4 supplies the horizontal synchronization signal HD, the vertical synchronization signal VD, and other necessary timing signals to the CMOS imager 2. The timing signals from the reference timing signal generating part in the digital signal processing unit 4 are also supplied to the camera control microcomputer 5.

The CMOS imager 2 is provided with a reader and a readout timing signal generator in order to read out pixel data from each pixel by the readout method shown in FIG. 3. The readout timing signal generator in the CMOS imager 2 generates a readout timing signal in synchronization with the horizontal synchronization signal HD and the vertical synchronization signal VD received from the digital signal processing unit 4 and reads out the pixel data from the CMOS imager 2 on the basis of the control signal supplied from the camera control microcomputer 5.

The CMOS imager 2 is capable of reading out pixel data not only from the pixels in an effective pixel area but also from the pixels in a frame area outside the effective pixel area on the basis of the timing signals supplied from the digital signal processing unit 4 and the control signal supplied from the camera control microcomputer 5. The frame area is a shielded area which is shielded from light reflected from a subject. Accordingly, the pixel data from the pixels in the frame area represents the black level.

According to the first embodiment of the present invention, the digital signal processing unit 4 also includes a sharing-pixel black-level detecting part and a sharing-pixel black-level correcting part that reduce the nonuniformity between the sharing pixels. The sharing-pixel black-level detecting part and the sharing-pixel black-level correcting part will be described in detail below.

The camera control microcomputer 5 determines the state of the current captured image from detection data supplied from the digital signal processing unit 4 and camera shake information about the image pickup apparatus 10, supplied from the camera shake sensor 6, to control the image pickup apparatus 10 in accordance with various setting modes supplied through the human interface microcomputer 8. Specifically, the camera control microcomputer 5 supplies readout area specification data to the CMOS imager 2, captured image control data to the digital signal processing unit 4, lens control data to the lens driver unit 7, and gain control data for the automatic gain control to the analog signal processing unit 3.

The CMOS imager 2 sequentially reads out signals corresponding to a certain area specified with the readout area specification data (including specification of the effective pixel area or the frame area (shielded area)) in the image capturing area of the CMOS imager 2 in response to the readout timing signal supplied from the digital signal processing unit 4 and supplies the readout signals to the analog signal processing unit 3.

The digital signal processing unit 4, the lens driver unit 7, and the analog signal processing unit 3 perform processing corresponding to the control values supplied from the camera control microcomputer 5 to realize desired signal processing, timing signal generation, lens drive, and gain control.

The user interface unit 9 includes a key operation part receiving an operation of a user and a display device in which the mode of the image pickup apparatus 10 and camera information are displayed. For example, a menu operation by the user is controlled by the human interface microcomputer 8 through the user interface unit 9.

The human interface microcomputer 8 detects which shooting mode the user currently selects or which control the user wants on the basis of the instruction input by the user with the user interface unit 9 and supplies the detection result to the camera control microcomputer 5 as user instruction information.

Concurrently, the camera control microcomputer 5 supplies camera control information (the distance to the subject, the F-number, the shutter speed, and the magnification) that is acquired to the human interface microcomputer 8 and indicates the current camera information to the user with the display device of the user interface unit 9. A detailed description of such blocks is omitted herein because it is not directly related to the present invention.

Detailed Configuration of Digital Signal Processing Unit 4

Figure 5:
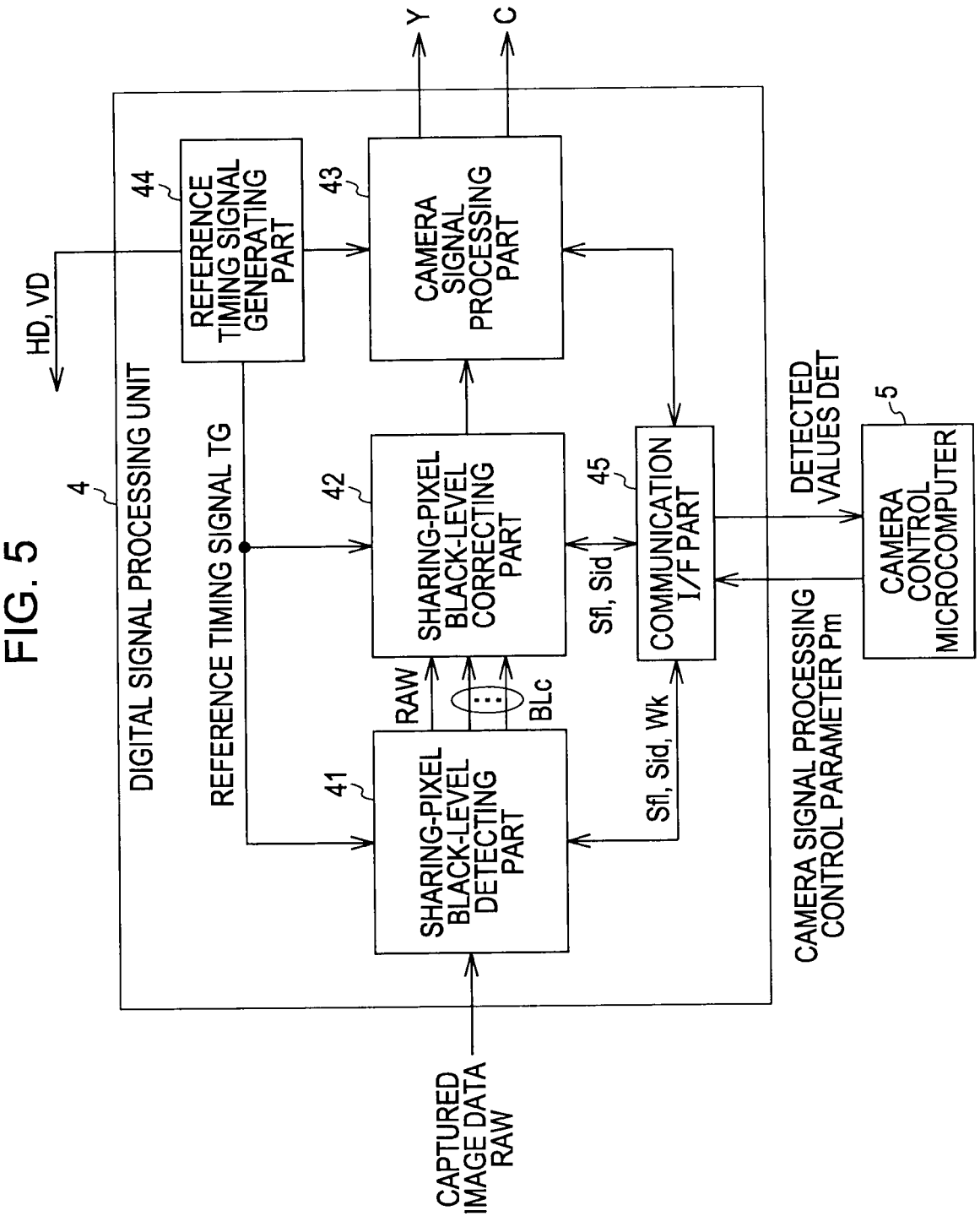
FIG. 5 is a block diagram showing in detail an example of the hardware configuration of a main unit in the image pickup apparatus according to the first embodiment of the present invention.

FIG. 5 is a block diagram showing in detail an example of the configuration of the digital signal processing unit 4. Referring to FIG. 5, the digital signal processing unit 4 includes a sharing-pixel black-level detecting part 41, a sharing-pixel black-level correcting part 42, a camera signal processing part 43, a reference timing signal generating part 44, and a communication interface part 45.

The reference timing signal generating part 44 generates the horizontal synchronization signal HD and the vertical synchronization signal VD described above and supplies the generated horizontal synchronization signal HD and vertical synchronization signal VD to the CMOS imager 2. The reference timing signal generating part 44 also supplies a reference timing signal TG on which the timing of each pixel is based to the sharing-pixel black-level detecting part 41 and the sharing-pixel black-level correcting part 42. The reference timing signal generating part 44 further supplies various timing signals to the camera signal processing part 43. Although not shown in FIG. 5, the reference timing signal generating part 44 supplies various timing signals to the camera control microcomputer 5.

The communication interface part 45 supplies various detection values DET supplied from the camera signal processing part 43 to the camera control microcomputer 5. The camera control microcomputer 5 generates the control signal, for example, the automatic gain control signal, on the basis of the various detection values DET and supplies the generated control signal to the corresponding processing part.

The communication interface part 45 receives a camera signal processing control parameter Pm from the camera control microcomputer 5 and supplies necessary control signals to the sharing-pixel black-level detecting part 41, the sharing-pixel black-level correcting part 42, and the camera signal processing part 43.

Figure 6:
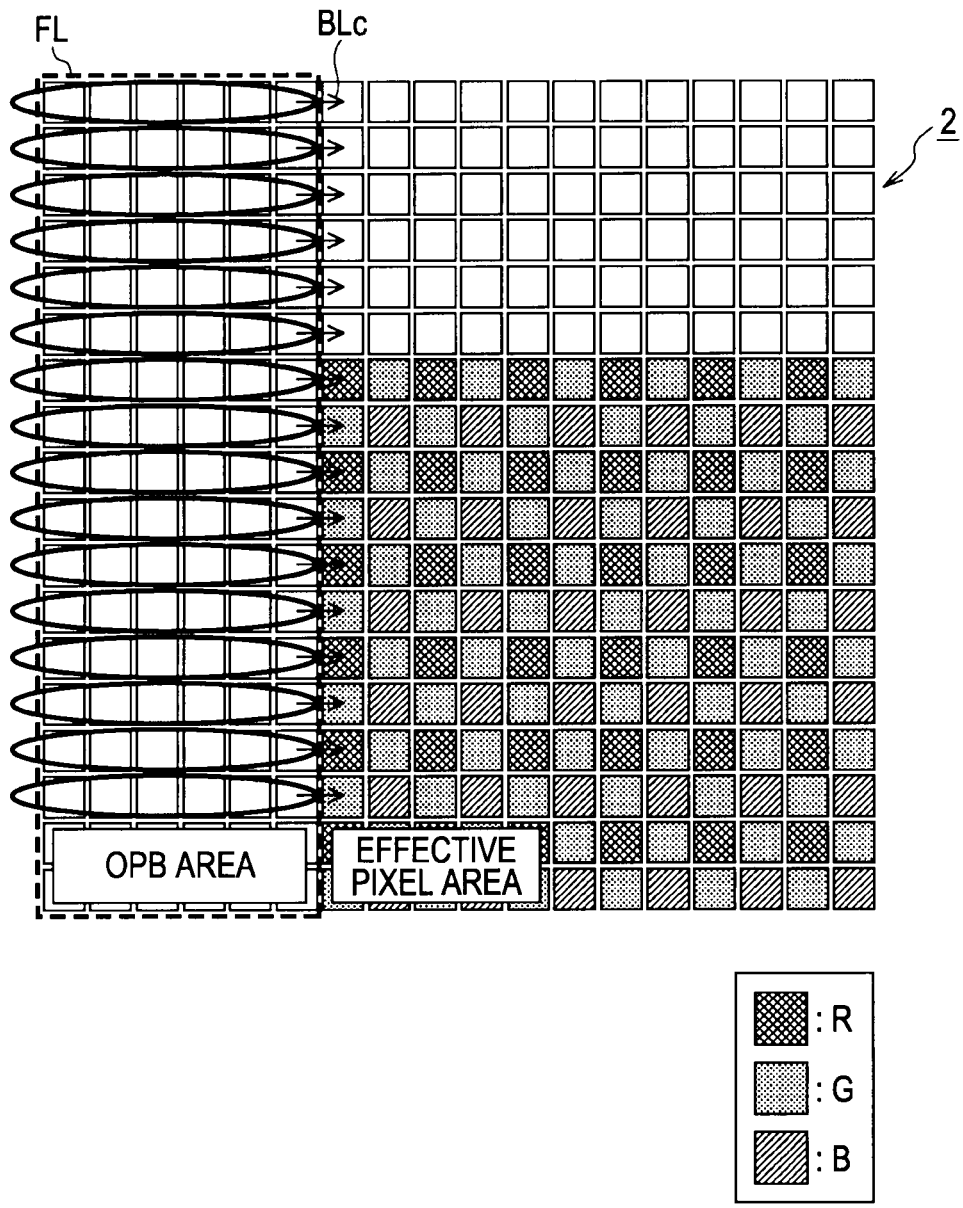
FIG. 6 is a diagram used for describing the image pickup apparatus according to the first embodiment of the present invention.

The sharing-pixel black-level detecting part 41 receives the captured image data RAW from the analog signal processing unit 3 and detects the average black level of each sharing pixel for every row or for every screen to detect a black level. The detection of the black level is performed by using information read out from optical black (OPB) areas in the frame area outside the effective pixel area of the CMOS imager 2, as shown in FIG. 6. The OPB areas are provided for detecting the black level.

In the example shown in FIG. 6, only the OPB areas in the frame areas at the left and right ends of the entire pixel area of the CMOS imager 2, among the OPB areas in the frame areas at the upper, lower, left, and right ends thereof, are set as black level detection frames FLs. The OPB area at the right end of the entire pixel area is not shown in FIG. 6. As described above, the CMOS imager 2 reads out pixel data not only from the effective pixel area but also from the OPB area on the basis of the timing signals supplied from the digital signal processing unit 4 and the control signal supplied from the camera control microcomputer 5. The camera control microcomputer 5 determines whether the area from which the pixel data is read out by the CMOS imager 2 is the OPB area or the effective pixel area on the basis of the timing signals supplied from the digital signal processing unit 4.

Area indication information Sfl is supplied from the camera control microcomputer 5 to the sharing-pixel black-level detecting part 41 through the communication interface part 45. The area indication information Sfl indicates whether the captured image data RAW supplied from the analog signal processing unit 3 is read out from the black level detection frame FL in the frame area or from an area, such as the effective pixel area, which does not correspond to the black level detection frame FL.

In addition, as described below, information concerning the sharing pixel IDs described above with reference to FIGS. 4A to 4C, that is, sharing pixel ID setting information Sid is supplied from the camera control microcomputer 5 to the sharing-pixel black-level detecting part 41 through the communication interface part 45. The sharing pixel ID setting information Sid is used for detecting the black level of each sharing pixel. Furthermore, as described above, integrator setting information Wk is supplied from the camera control microcomputer 5 to a sharing-pixel integration processing section 414 in the sharing-pixel black-level detecting part 41 through the communication interface part 45.

The sharing-pixel black-level detecting part 41 delays the captured image data RAW supplied from the analog signal processing unit 3 for the time during which the black level of each sharing pixel is detected and supplies the delayed captured image data RAW to the sharing-pixel black-level correcting part 42. The sharing-pixel black-level detecting part 41 supplies sharing pixel black level information BLc that is detected to the sharing-pixel black-level correcting part 42 in synchronization with the captured image data RAW.

The sharing-pixel black-level correcting part 42 corrects the captured image data RAW, which is the main line signal, by using the sharing pixel black level information BLc detected by the sharing-pixel black-level detecting part 41, for every sharing pixel (for every sharing pixel ID) and for every row in a manner described below.

Specifically, in the example shown in FIG. 5, the sharing-pixel black-level correcting part 42 subtracts the average black level of each sharing pixel (of each sharing pixel ID) in the sharing pixel black level information BLc from the captured image data RAW. The subtraction corresponding to digital clamping is performed for every sharing pixel (for every sharing pixel ID) and for every row.

The sharing pixel ID setting information Sid used for the processing for every sharing pixel (for every sharing pixel ID) is supplied from the camera control microcomputer 5 to the sharing-pixel black-level correcting part 42 through the communication interface part 45.

The sharing-pixel black-level correcting part 42 supplies the captured image data subjected to the correction to the camera signal processing part 43.

The camera signal processing part 43 performs a variety of camera signal processing, such as noise reduction, defect correction, demosaicing, white balancing, and resolution conversion in the related art, in response to a control instruction from the camera control microcomputer 5 through the communication interface part 45 and supplies luminance data Y and color data C, which are output data, to the downstream video processing block (not shown). A detailed description of the camera signal processing part 43 is omitted herein because it is not directly related to the present invention.

Description of Sharing-Pixel Black-Level Detecting Part 41

Figure 7:
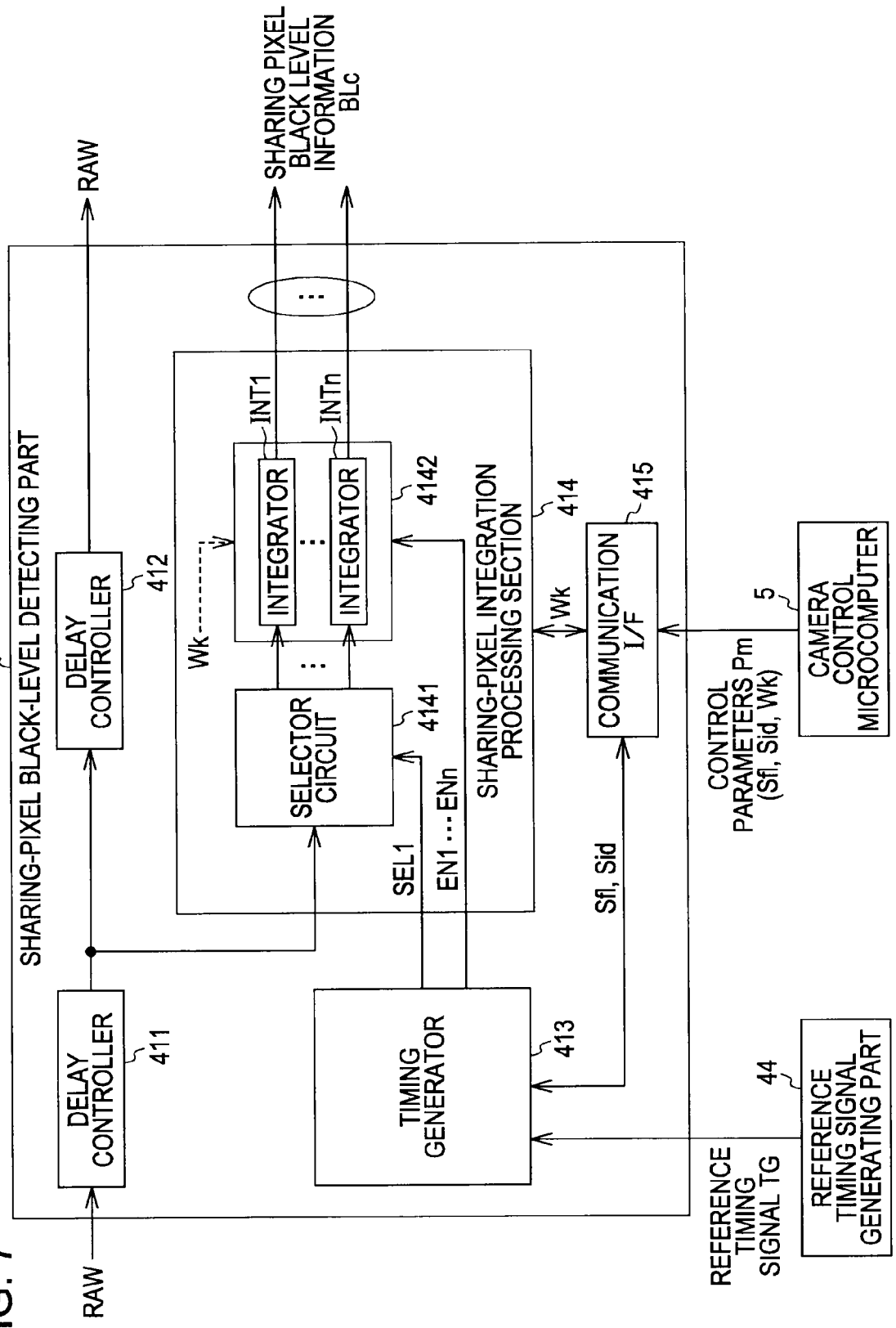
FIG. 7 is a block diagram showing an example of the hardware configuration of a part in the hardware configuration shown in FIG. 5.

FIG. 7 is a block diagram showing in detail an example of the configuration of the sharing-pixel black-level detecting part 41. The sharing-pixel black-level detecting part 41 includes delay controllers 411 and 412 provided for the captured image data RAW, which is the main line signal, a timing generator 413, the above-mentioned sharing-pixel integration processing section 414, and a communication interface 415.

The delay controllers 411 and 412 delay the captured image data RAW for the time corresponding to the delay in the sharing-pixel black-level detecting part 41 to synchronize the time when the captured image data RAW is output with the sharing pixel black level information BLc generated in the sharing-pixel black-level detecting part 41.

The sharing-pixel integration processing section 414 includes an integrator circuit 4142 and a selector circuit 4141. The integrator circuit 4142 includes integrators INT1 to INTn provided for n (n denotes an integer not smaller than two) sharing pixels, that is, provided for the sharing pixel IDs. The selector circuit 4141 selects any one of the integrator INT1 to INTn to which the captured image data PAW from the delay controller 411 is to be supplied. A selection control signal SEL1 is supplied from the timing generator 413 to the selector circuit 4141. Enable signals EN1 to ENn controlling the time period during which each of the integrators INT1 to INTn performs the integration are supplied from the timing generator 413 to the integrators INT1 to INTn, respectively.

The timing generator 413 generates the selection control signal SEL1 and the enable signals EN1 to ENn in the black level detection frame FL (refer to FIG. 6) on the basis of the reference timing signal TG supplied from the reference timing signal generating part 44, and the area indication information Sfl and the sharing pixel ID setting information Sid supplied from the camera control microcomputer 5 through the communication interface 415 at the time when each sharing pixel (the pixel indicated by each sharing pixel ID) appears in the captured image data RAW, shown in the lower lines in FIGS. 4A to 4C, and supplies the generated selection control signal SEL1 and the enable signals EN1 to ENn to the sharing-pixel integration processing section 414.

In the example shown in FIG. 7, the selector circuit 4141 is selected and controlled in the black level detection frame FL in response to the selection control signal SEL1 on the basis of the sharing pixel ID. For example, if the sharing pixel ID="0", the selector circuit 4141 supplies the captured image data RAW from the delay controller 411 to the integrator INT1. If the sharing pixel ID="1", the selector circuit 4141 supplies the captured image data RAW from the delay controller 411 to the integrator INT2. The same applies to the subsequent integrators.

The enablement of the integrators INT1 to INTn is controlled in response to the enable signals EN1 to ENn in the black level detection frame FL. For example, if the sharing pixel ID="0", the integrator INT1 is enabled. If the sharing pixel ID="1", the integrator INT2 is enabled.

Figure 8:
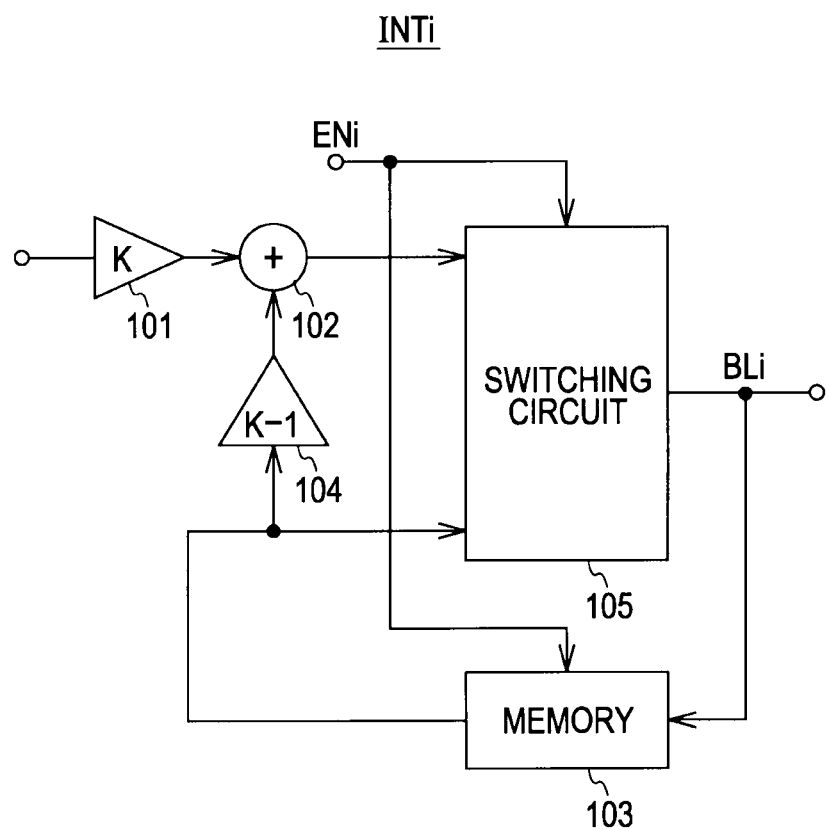
FIG. 8 is a block diagram showing an example of the hardware configuration of a part in the hardware configuration in FIG. 7.

Each of the integrators INT1 to INTn has a configuration shown in FIG. 8. FIG. 8 is a block diagram showing an example of the configuration of one integrator INTi (i=1, 2, ..., n) among the integrators INT1 to INTn. The integrator INTi has the configuration of an infinite impulse response (IIR) digital filter. The value of "n" is equal to two in the examples in FIGS. 4A and 4B, and the value of "n" is equal to four in the example in FIG. 4C.

In the integrator INTi shown in FIG. 8, the captured image data RAW, which is the main line signal supplied from the selector circuit 4141, is supplied to a multiplier circuit 101 where the captured image data RAW is multiplied by a constant K (K<1). The captured image data RAW supplied to the multiplier circuit 101 is the pixel data (black level) that is read out from the black level detection frame FL and that is read from the pixel having the sharing pixel ID corresponding to the integrator INTi. The black level data resulting from the multiplication of the constant K is supplied from the multiplier circuit 101 to an adder circuit 102.

The integrator INTi includes a memory 103 storing the integration result (the average black level). The integration result read out from the memory 103 is supplied to a multiplier circuit 104 where the integration result is multiplied by a constant (K−1). The black level data resulting from the multiplication of the constant K−1 is supplied from the multiplier circuit 104 to the adder circuit 102. The addition result in the adder circuit 102 is supplied to one input port of a switching circuit 105.

The average black level, which is the integration result read out from the memory 103, is supplied to the other input port of the switching circuit 105.

In the integrator INTi in FIG. 8, an enable signal ENi corresponding to the integrator INTi is supplied to the switching circuit 105 and the memory 103. The switching circuit 105 selects and outputs the addition result from the adder circuit 102 if the sharing pixel having the sharing pixel ID corresponding to the integrator INTi, among the sharing pixels, is supplied to the integrator INTi. In response to the enable signal ENi, the integration result (the average black level) in the memory 103 is updated to the value which is newly input and in which the pixel data (the black level) read out from the pixel having the sharing pixel ID corresponding to the integrator INTi is reflected.

The switching circuit 105 selects and outputs the integration result (the average black level) from the memory 103 except when the sharing pixel having the sharing pixel ID corresponding to the integrator INTi is supplied to the integrator INTi. The output from the switching circuit 105 corresponds to an average black level BLi for the pixel data read out from the sharing pixel having the sharing pixel ID corresponding to the integrator INTi, among the sharing pixels. Since the integration value (the average black level) stored in the memory 103 is updated for every black level detection frame FL in the example in FIG. 8, the integration value in the memory 103 is updated with the horizontal period.

The sharing pixel black level information BLc is composed of black level outputs BL1 to BLn from the multiple integrators INT1 to INTn in the integrator circuit 4142.

The integration operation of the integrators INT1 to INTn is controlled in accordance with the integrator setting information Wk supplied from the camera control microcomputer 5. For example, the integrators INT1 to INTn vary the value of the constant K in accordance with the integrator setting information Wk to switch the integration time constant.

The captured image data RAW, which is the main line signal supplied to the sharing-pixel black-level detecting part 41, is delayed for the time necessary to perform the above processing by the delay controllers 411 and 412 and the delayed captured image data RAW is directly supplied to the downstream sharing-pixel black-level correcting part 42.

The OPB area used for detecting the black level is normally provided in the solid-state image pickup device, as shown in FIG. 6. Accordingly, with the black level detection frame FL set in the manner shown in FIG. 6, the sharing-pixel black-level detecting part 41 calculates the average black level of each sharing pixel ID for every horizontal row in the OPB area, stores the calculated average in the memory, and outputs the stored average to the downstream processing part in synchronization with the main line signal.
Description of Sharing-Pixel Black-Level Correcting Part 42

Figure 9:
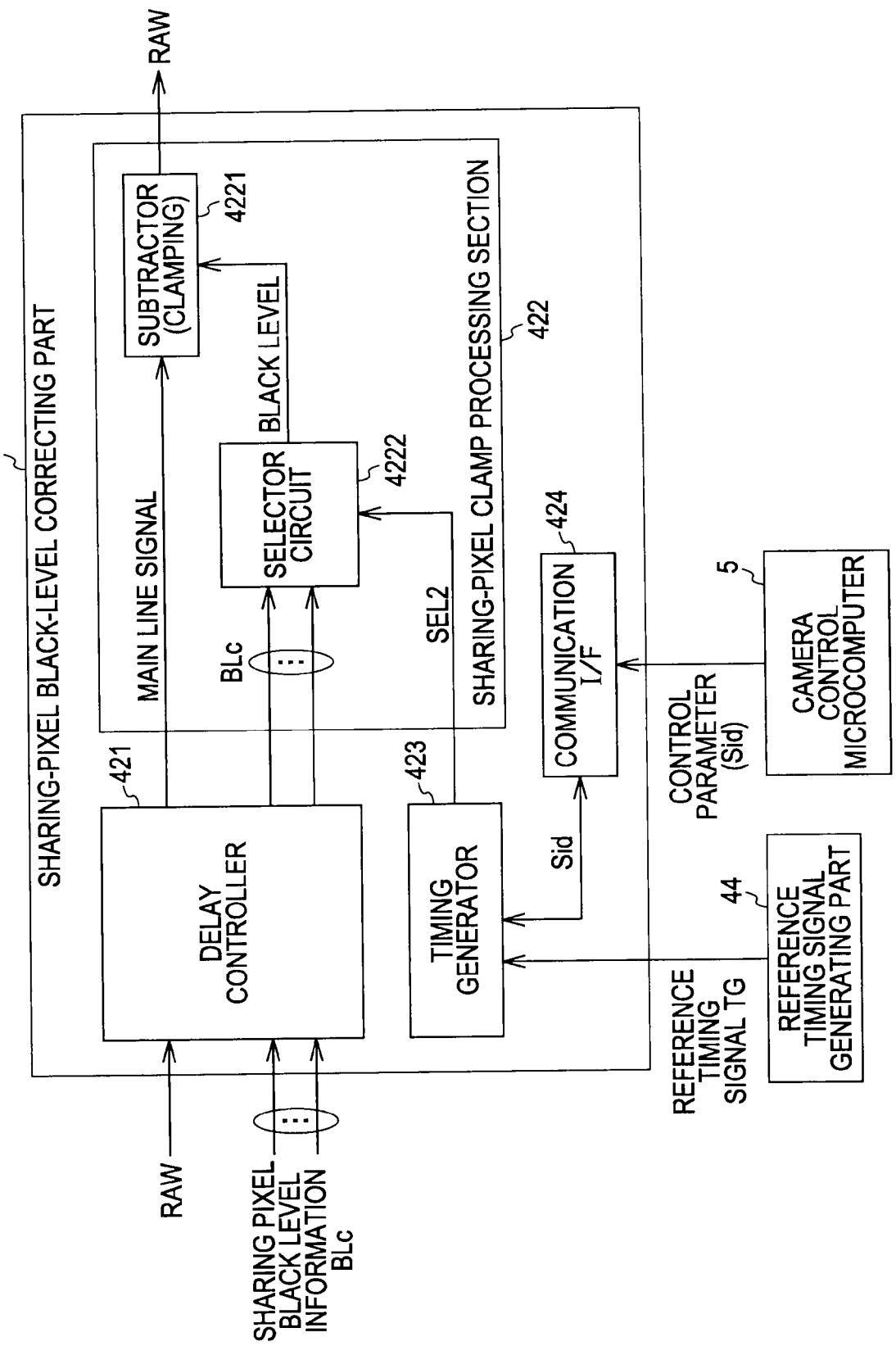
FIG. 9 is a block diagram showing an example of the hardware configuration of another part in the digital signal processing unit shown in FIG. 5.

FIG. 9 is a block diagram showing in detail an example of the configuration of the sharing-pixel black-level correcting part 42. The sharing-pixel black-level correcting part 42 includes a delay controller 421, a sharing-pixel clamp processing section 422, a timing generator 423, and a communication interface 424. The delay controller 421 is provided for the captured image data RAW, which is the main line signal from the sharing-pixel black-level detecting part 41, and the sharing pixel black level information BLc.

The delay controller 421 delays the captured image data PAW and the sharing pixel black level information BLc for the time necessary to perform the processing in the timing generator 423 to synchronize the processing in the timing generator 423 with the captured image data PAW and the sharing pixel black level information BLc.

The sharing-pixel clamp processing section 422 includes a subtractor 4221 performing the digital clamping, and a selector circuit 4222. The captured image data PAW, which is the main line signal, is supplied from the delay controller 421 to the subtractor 4221. The sharing pixel black level information BLc is supplied from the delay controller 421 to the selector circuit 4222.

The selection in the selector circuit 4222 is controlled in response to a selection control signal SEL2 that is supplied to the selector circuit 4222. The selector circuit 4222 selects the average black level BLi of each pixel (each pixel having the same sharing pixel ID in the pixel output sequence represented by the sharing pixel IDs) in the sharing pixel black level information BLc in synchronization with the time when the corresponding sharing pixel (having the corresponding same sharing pixel ID) appears in the captured image data RAW, which is the main line signal supplied to the subtractor 4221, and supplies the selected the average black level BLi to the subtractor 4221.

The selection control signal SEL2 is supplied from the timing generator 423 to the selector circuit 4222. The timing generator 423 generates the selection control signal SEL2 on the basis of the reference timing signal TG supplied from the reference timing signal generating part 44 and the sharing pixel ID setting information Sid supplied from the camera control microcomputer 5 through the communication interface 424.

In the example shown in FIG. 9, the timing generator 423 generates the selection control signal SEL2 causing the average black level BLi of each sharing pixel (the pixel represented by each sharing pixel ID) to be selected by the selector circuit 4222 in synchronization with the time (the sharing pixel ID sequence) when the corresponding sharing pixel appears in the captured image data RAW, which is the main line signal, and supplies the generated selection control signal SEL2 to the selector circuit 4222.

Accordingly, the subtractor 4221 subtracts the average black level BLi of each sharing pixel ID, selected by the selector circuit 4222, from the corresponding pixel data in the main line signal to perform the digital clamping for every sharing pixel, that is, for every sharing pixel ID. The subtractor 4221 supplies the captured image data RAW subjected to the digital clamping to the downstream camera signal processing part 43.

As described above, according to the first embodiment of the present invention, the black level (the average black level) is detected for every sharing pixel and the digital clamping is performed for every sharing pixel by using the detected average black level. Consequently, it is possible to reduce the nonuniformity in the black level for every sharing pixel even if the imager to which the pixel sharing technology is applied is used.

In the processing in the first embodiment of the present invention, the digital clamping for every row is performed for every sharing pixel (for every sharing pixel ID).

Although the detection and correction of the black level is performed for every row in the first embodiment of the present invention, it is not necessary for the sharing-pixel black-level detecting part 41 to reset the integration value for every row if the integration value of the black level of each row is not sufficient for the processing, for example, if the OPB area is too small. The sharing-pixel black-level detecting part 41 may pass the integration result across multiple rows (for example, the IIR integrator).

However, it is important to perform the digital clamping for every sharing pixel ID. In addition, since the black level is detected and corrected for every row, common vertical shading may be provided for every sharing pixel.

Since the pixel output sequence represented by the sharing pixel IDs is varied in accordance with the arrangement pattern of the sharing pixels in the solid-state image pickup device, as shown in the lower lines in FIGS. 4A to 4C, the pixel output sequence depends on the solid-state image pickup device that is used. Accordingly, it is preferred that the selection control signals SEL1 and SEL2 be appropriately generated in accordance with the sharing pixel ID setting information Sid supplied from the camera control microcomputer 5.

Second Embodiment

Although the detection and correction of the black level is performed for every row in the first embodiment of the present invention, it is preferred that the average black level be calculated by using many pixels in order to increase the effect of the averaging if a vertical variation in the black level with respect to each sharing pixel does not occur because of the characteristics of the solid-state image pickup device.

Accordingly, according to a second embodiment of the present invention, the sharing-pixel black-level detecting part 41 outputs the sharing pixel black level information BLc for every screen, instead of outputting the sharing pixel black level information BLc for every row.

Figure 10:
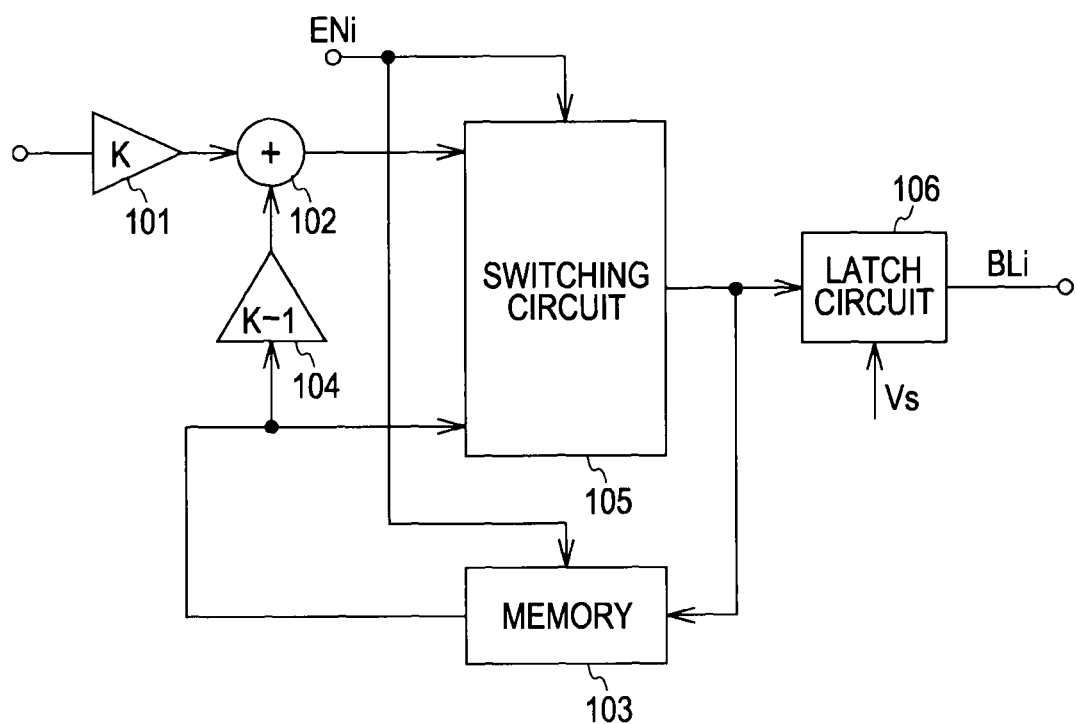
FIG. 10 is a block diagram showing an example of the configuration of a part in an image pickup apparatus according to a second embodiment of the present invention.

FIG. 10 is a block diagram showing an example of the configuration of each of the integrators INT1 to INTn in the integrator circuit 4142 in the sharing-pixel black-level detecting part 41 according to the second embodiment of the present invention.

The integrator INTi shown in FIG. 10 includes a latch circuit 106 latching the output from the switching circuit 105, in addition to the components in the integrator INTi according to the first embodiment. The latch circuit 106 latches the output from the switching circuit 105 in response to a latch signal Vs having the vertical period.

In the integrator INTi in FIG. 10, after the black levels are integrated up to the lower right end of the black level detection frame FL and the integration value is stored in the memory 103, the value stored in the memory 103 (the average black level) is latched in the latch circuit 106 and the latched data is output as the average black level BLi of the corresponding sharing pixel ID.

In other words, the black level (the average black level) of each pixel having the same sharing pixel ID is calculated across one screen and the signal corresponding to the calculated black level is applied to the digital clamping for the next screen. The other configuration in the second embodiment of the present invention is similar to that in the first embodiment of the present invention.

Although a time delay corresponding to one vertical period occurs between the detection of the black level and the captured image signal to be applied in the above case, this delay generally causes no problem.

Since there is a time lag between the detection of the black level and the application of the detected value to the black level correction in the second embodiment of the present invention, the sharing pixel black level information BLc may be supplied to the camera control microcomputer 5 as the detected value, the detected value may be appropriately processed in the camera control microcomputer 5, and the processed value may be supplied to the sharing-pixel black-level correcting part 42. Although a time delay longer than one vertical period can occur between the detection of the black level and the application of the detected value to the black level correction in this case, the time delay generally causes no problem if it is a sufficiently short time corresponding to several vertical periods.

Third Embodiment

The nonuniformity in the black level between the pixels having different sharing pixel IDs is detected and corrected as the nonuniformity in the pixel characteristics of the sharing pixels in the first and second embodiments of the present invention described above. However, the nonuniformity in the pixel characteristics between the pixels having different sharing pixel IDs is not limited to the nonuniformity in the black level.

For example, the pixels having different sharing pixel IDs can have different characteristics in terms of the "sensitivity" of the pixels or the "linearity" of the pixel outputs because the direction of the openings of the photodiodes of the pixels differs between the pixels having different sharing pixel IDs. A third embodiment of the present invention is provided in order to resolve such a problem.

Figure 11:
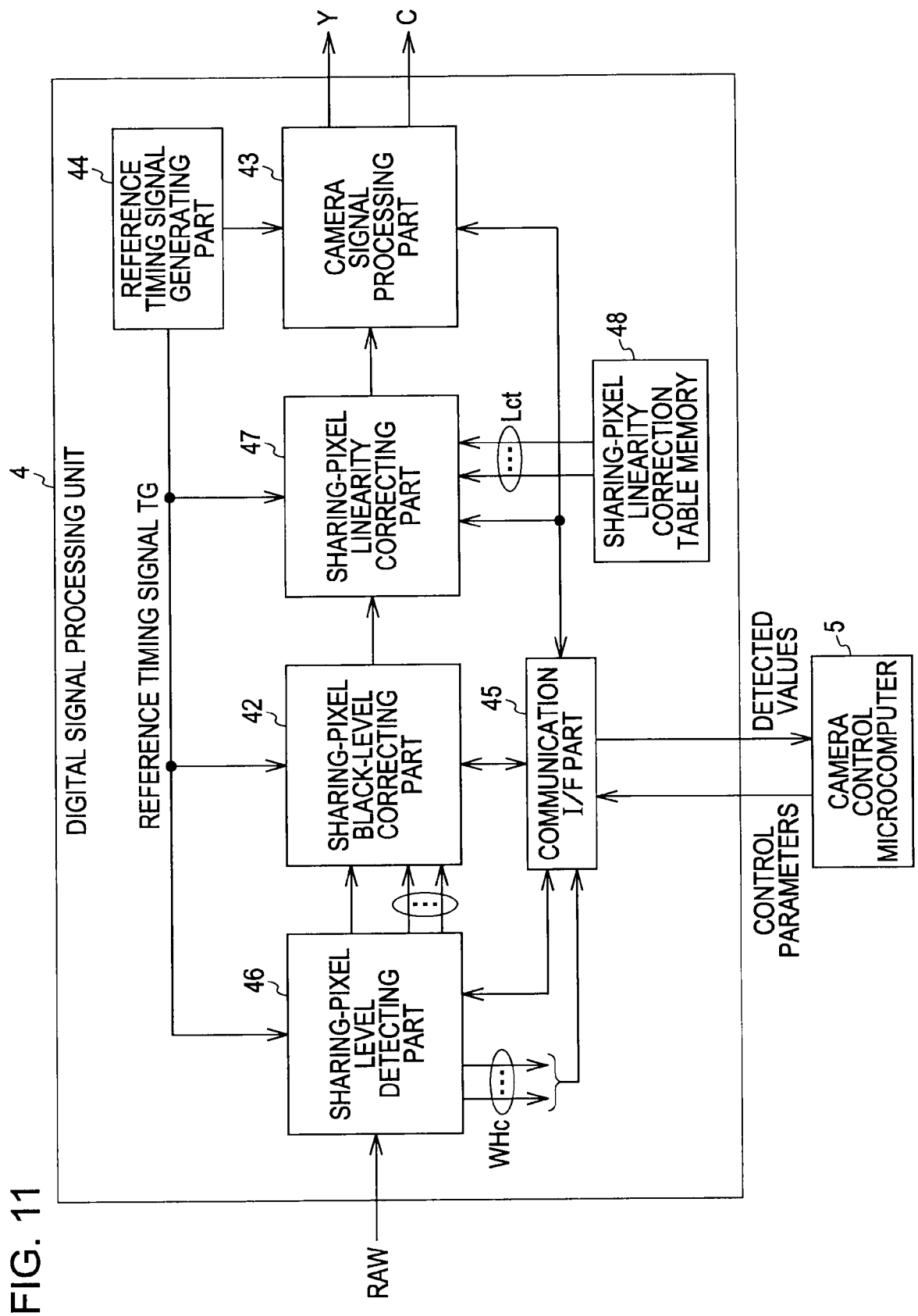
FIG. 11 is a block diagram showing an example of the hardware configuration of a main unit in an image pickup apparatus according to a third embodiment of the present invention.

FIG. 11 is a block diagram showing an example of the configuration of a digital signal processing unit 4 according to the third embodiment of the present invention.

In the digital signal processing unit 4 shown in FIG. 11, the sharing-pixel black-level detecting part 41 according to the above embodiments is replaced with a sharing-pixel level detecting part 46 detecting not only the black level and but also levels other than the black level. In addition, the digital signal processing unit 4 in FIG. 11 includes a sharing-pixel linearity correcting part 47 and a sharing-pixel linearity correction table memory 48 between the sharing-pixel black-level correcting part 42 and the camera signal processing part 43, in addition to the configuration according to the first and second embodiments of the present invention.

The sharing-pixel level detecting part 46 basically has the same hardware configuration as the sharing-pixel black-level detecting part 41 according to the first and second embodiments of the present invention. However, the sharing-pixel level detecting part 46 according to the third embodiment of the present invention has a component (function) of detecting and generating sharing pixel white level information WHc, in addition to the component (function) of detecting and generating the sharing pixel black level information BLc in the first and second embodiments of the present invention.

Figure 12:
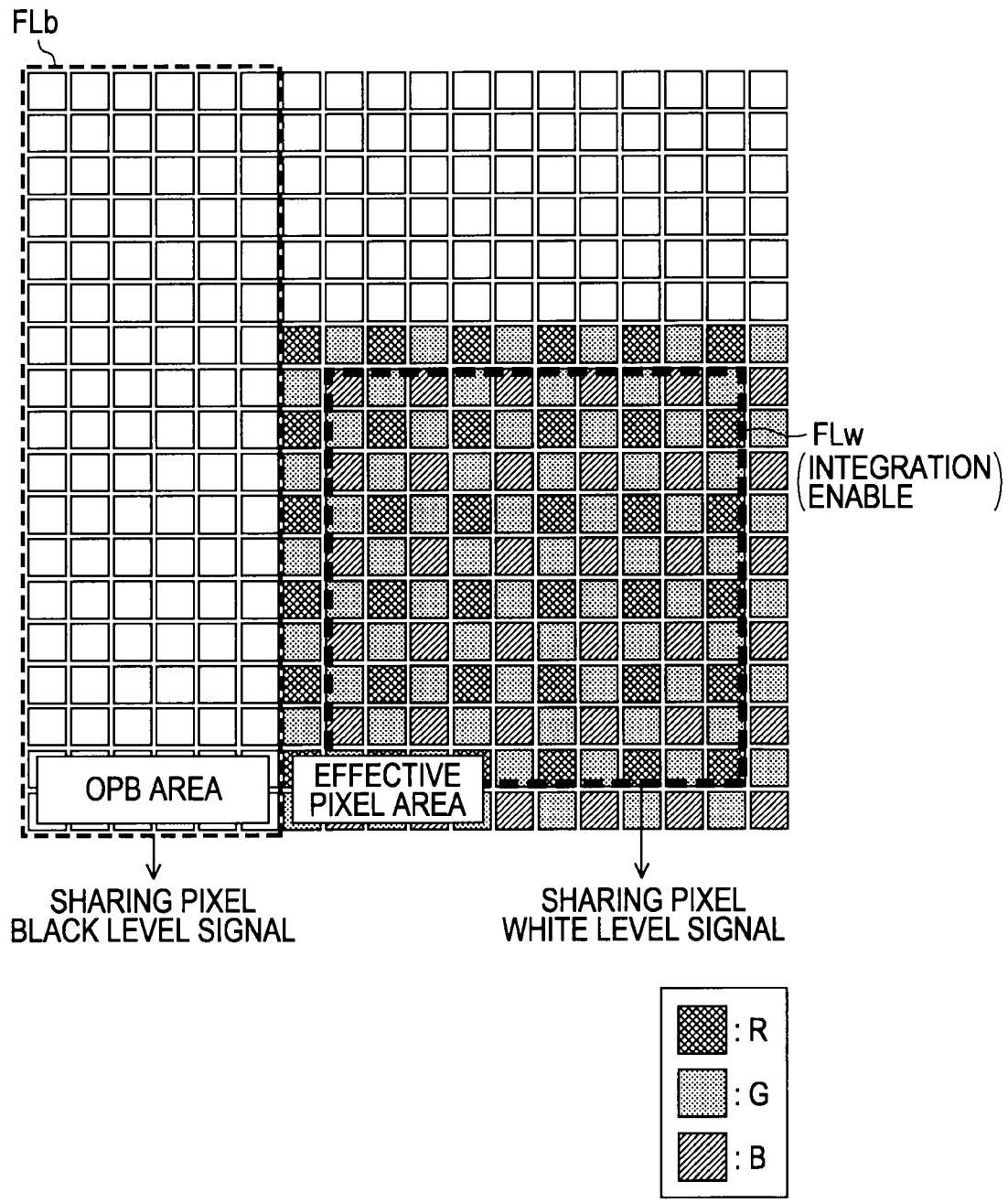
FIG. 12 is a diagram used for describing the image pickup apparatus according to the third embodiment of the present invention.

Specifically, as shown in FIG. 12, the detection frame is set to a black level detection frame FLb in the OPB area when the sharing pixel black level information BLc is to be detected while the detection frame is set to a white level detection frame FLw (surrounded by a bold broken line in FIG. 12) in the effective pixel area when the sharing pixel white level information WHc is to be detected. When the sharing pixel white level information WHc is to be detected and generated, an image of a fully uniform subject, such as a white wall or board, is captured. An image of a subject of a color other than white may be captured as long as the subject has a fully uniform surface.

The pixel signals are averaged for every sharing pixel ID and the averaged pixel signals are output in the same manner as in the first embodiment of the present invention although the detection frame is switched between the black level detection frame FLb and the white level detection frame FLw. In other words, since the same circuit configuration can be used for the sharing-pixel level detecting part 46 both in the black level detection and in the white level detection, only one circuit is provided in order to reduce the circuit size and the detection frame is switched between the black level detection frame and the white level detection frame.

According to the third embodiment of the present invention, an image of a fully uniform subject can be captured with a pattern box etc. by, for example, line control at the factory to yield the average signal level (corresponding to the sharing pixel white level information WHc) for every sharing pixel ID. Controlling the aperture or a neutral density (ND) filter in the optical unit 1 in this state to adjust the input light intensity allows the camera control microcomputer 5 to recognize the output for every sharing pixel ID corresponding to the input light (the input signal level).

Figure 13A:
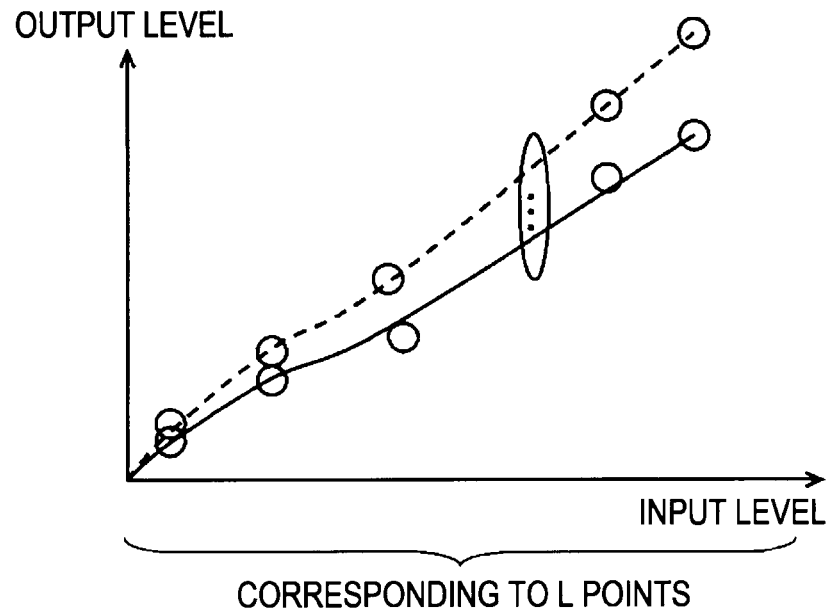
FIGS. 13A and 13B are graphs used for describing the image pickup apparatus according to the third embodiment of the present invention.

Data about the average signal level (L (L denotes an integer not smaller than two) pieces of data) for every sharing pixel ID at the L different input signal levels is acquired in the above manner. This results in, for example, a sensitivity curve for every sharing pixel ID shown in FIG. 13A. In the sensitivity curve in FIG. 13A, the horizontal axis represents the input level and the vertical axis represents the output level.

Figure 13B:
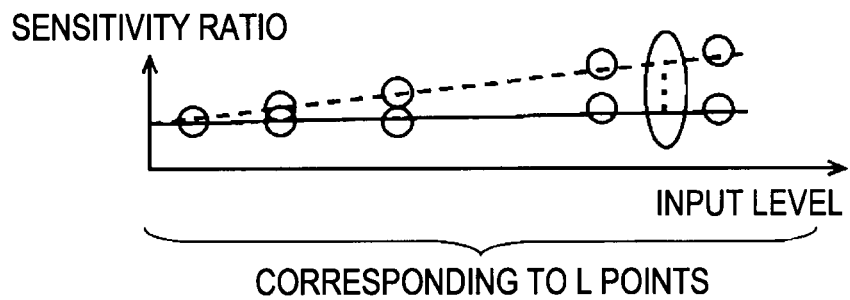

The camera control microcomputer 5 can calculate the sensitivity ratio of the output signal level from the data acquired at the factory in the above manner to yield linearity correction table data Lct for the L different input levels for every sharing pixel ID, as shown in FIG. 13B.

Since the linearity correction table data Lct is calculated for every sharing pixel ID in this example, the n pieces of linearity correction table data Lct1 to Lctn are calculated for every sharing pixel ID. As described above, each of the linearity correction table data Lct1 to Lctn for every sharing pixel ID includes correction value data for the L different input signal levels.

According to the third embodiment of the present invention, the linearity correction table data Lct (the n pieces of linearity correction table data Lct1 to Lctn) for every sharing pixel ID, calculated in the above manner, is stored in the sharing-pixel linearity correction table memory 48 in advance as preset data. The sharing-pixel linearity correction table memory 48 is, for example, an electronically erasable and programmable read only memory (EEPROM).

The correction table data for every sharing pixel ID for various input lights (the input signal levels corresponding to the captured image data) is acquired at the factory and is stored in the sharing-pixel linearity correction table memory 48 in advance in the above description. However, the camera control microcomputer 5 may acquire the linearity correction table data Lct for every sharing pixel ID corresponding to the input light from the sharing pixel white level information WHc acquired by the user who captures an image of, for example, a white wall or board with the image pickup apparatus 10 before an image of a subject is actually captured and may store the acquired linearity correction table data Lct in the sharing-pixel linearity correction table memory 48.

Figure 14:
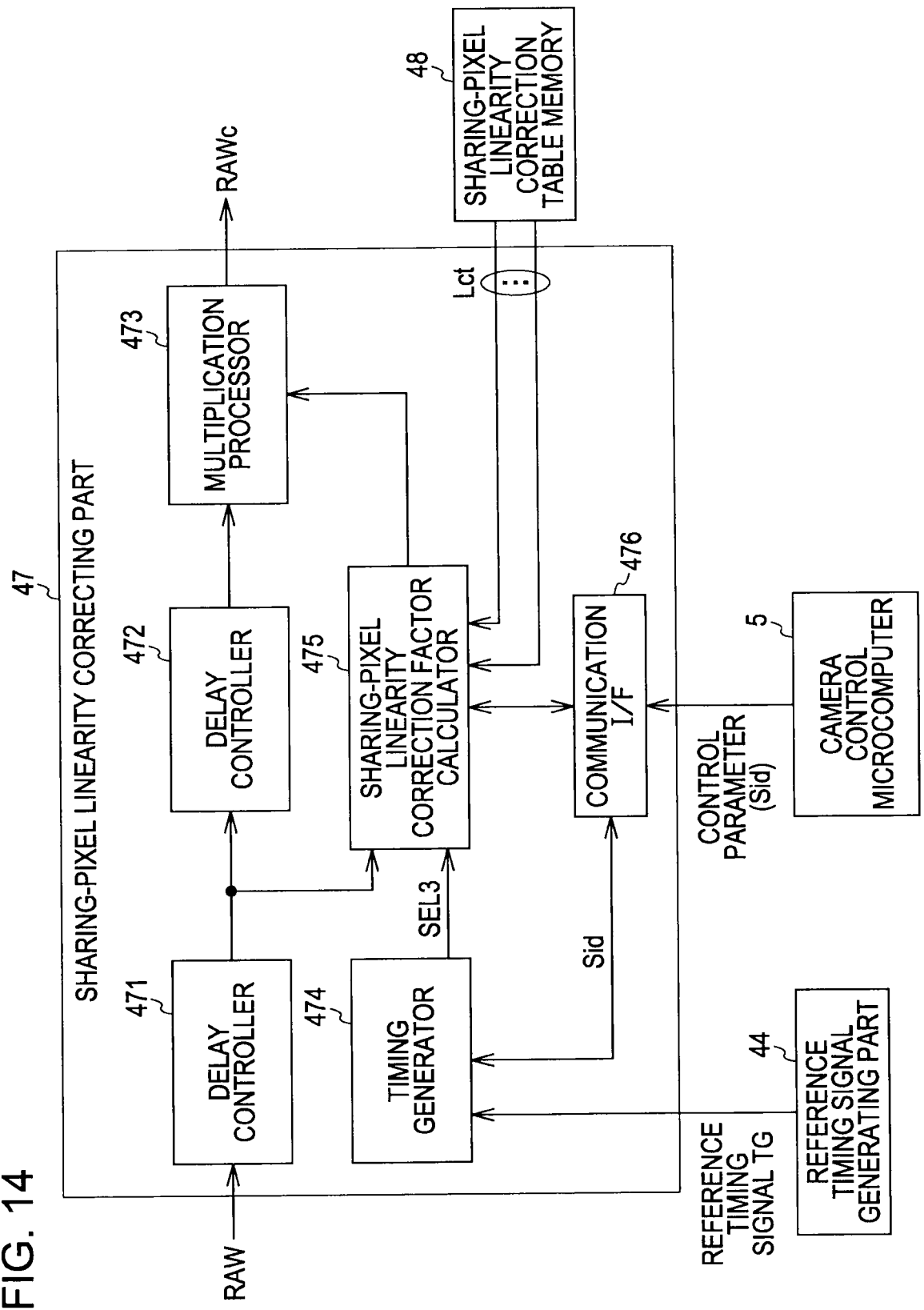
FIG. 14 is a block diagram showing an example of the hardware configuration of a part in the hardware configuration shown in FIG. 11.

FIG. 14 is a block diagram showing an example of the configuration of the sharing-pixel linearity correcting part 47. The sharing-pixel linearity correcting part 47 in FIG. 14 includes delay controllers 471 and 472 provided for the captured image data RAW, which is the main line signal, a multiplication processor 473, a timing generator 474, a sharing-pixel linearity correction factor calculator 475, and a communication interface 476.

The delay controllers 471 and 472 delay the captured image data RAW, which is the main line signal, and supplies the delayed captured image data RAW to the multiplication processor 473. The delay controllers 471 and 472 are provided in the sharing-pixel linearity correcting part 47 in order to adjust the time when the captured image data RAW is corrected in the multiplication processor 473.

Figure 15:
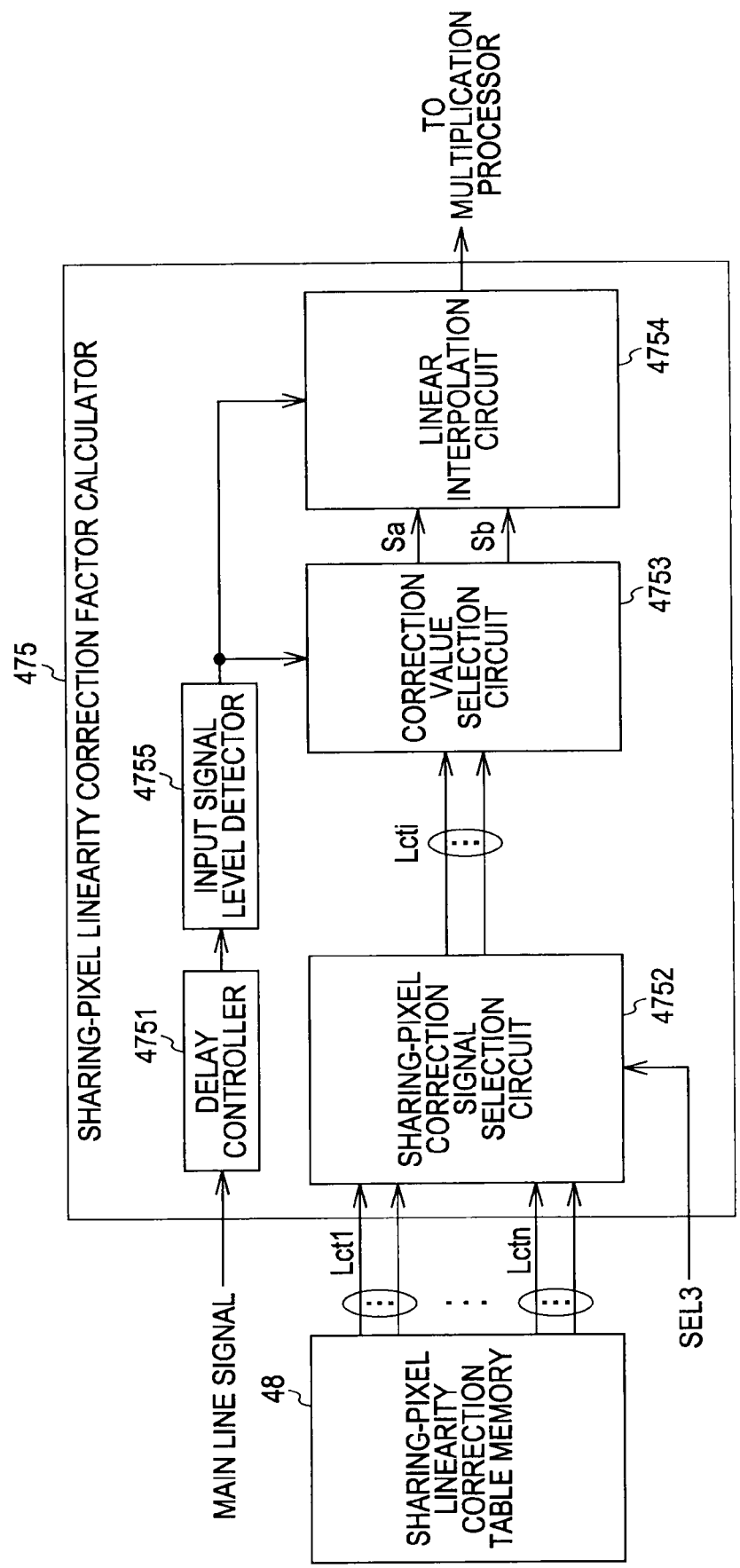
FIG. 15 is a block diagram showing an example of the hardware configuration of a part in the hardware configuration shown in FIG. 14.

The sharing-pixel linearity correction factor calculator 475 has a configuration shown in FIG. 15. The sharing-pixel linearity correction factor calculator 475 includes a delay controller 4751, a sharing-pixel correction signal selection circuit 4752, a correction value selection circuit 4753, a linear interpolation circuit 4754, and an input signal level detector 4755.

The delay controller 4751 is provided for synchronizing the timing of the captured image data RAW, which is the main line signal, with the timing of a linearity correction signal.

The n pieces of linearity correction table data Lct1 to Lctn for every sharing pixel ID are supplied from the sharing-pixel linearity correction table memory 48 to the sharing-pixel correction signal selection circuit 4752.

A selection control signal SEL3 is supplied from the timing generator 474 to the sharing-pixel correction signal selection circuit 4752. The timing generator 474 generates the selection control signal SEL3 on the basis of the reference timing signal TG supplied from the reference timing signal generating part 44 and the sharing pixel ID setting information Sid supplied from the camera control microcomputer 5 through the communication interface 476.

In the example shown in FIG. 14, the timing generator 474 generates the selection control signal SEL3 causing the linearity correction table data Lcti (i denotes any one of 1 to n) of each sharing pixel ID (the pixel represented by each sharing pixel ID) to be selected by the sharing-pixel correction signal selection circuit 4752 in synchronization with the time (the sharing pixel ID sequence) when the corresponding sharing pixel appears in the captured image data RAW, which is the main line signal, and supplies the generated selection control signal SEL3 to the sharing-pixel correction signal selection circuit 4752 in the sharing-pixel linearity correction factor calculator 475.

Since the pixel output sequence represented by the sharing pixel IDs is varied in accordance with the solid-state image pickup device that is used, it is preferred that the selection control signal SEL3 be appropriately generated in accordance with the sharing pixel ID setting information Sid supplied from the camera control microcomputer 5 through the communication interface 476.

The sharing-pixel correction signal selection circuit 4752 selects the L pieces of linearity correction table data Lcti with which the main line signal is to be corrected from the n pieces of linearity correction table data Lct1 to Lctn supplied from the sharing-pixel linearity correction table memory 48 in response to the selection control signal SEL3. In other words, the sharing-pixel correction signal selection circuit 4752 selects the sensitivity curve corresponding to the sharing pixel ID. The selected linearity correction table data Lcti for every sharing pixel ID is supplied from the sharing-pixel correction signal selection circuit 4752 to the correction value selection circuit 4753.

The captured image data RAW, which is the main line signal supplied through the delay controller 4751, is supplied to the input signal level detector 4755 where the input signal level is detected. The input signal level detected by the input signal level detector 4755 is supplied to the correction value selection circuit 4753.

The correction value selection circuit 4753 refers to the input signal level, which is the main line signal supplied from the input signal level detector 4755, to select correction data Sa and Sb at the two points closest to the input signal level from the L pieces of linearity correction table data Lcti and supplies the selected two pieces of correction data Sa and Sb to the linear interpolation circuit 4754.

The linear interpolation circuit 4754 calculates the correction factor suitable for the level of the main line signal from the two pieces of correction data Sa and Sb supplied from the correction value selection circuit 4753 and the level of the main line signal acquired from the input signal level detector 4755 by linear interpolation and supplies the calculated correction factor to the multiplication processor 473.

The multiplication processor 473 multiplies the captured image data RAW, which is the main line signal supplied from the delay controller 472, by the correction factor supplied from the sharing-pixel linearity correction factor calculator 475 to perform linearity correction. The linearity correction results in captured image data RAWc in which the variation in the sensitivity between the pixels having different sharing pixel IDs is corrected. The captured image data RAWc is supplied from the sharing-pixel linearity correcting part 47 to the downstream camera signal processing part 43.

As described above, according to the third embodiment of the present invention, it is possible to correct the nonuniformity in the black level and in the sensitivity caused by the nonuniformity in the circuit layout between adjacent or near pixels in the arrangement pattern of the sharing pixels in the solid-state image pickup device with a very simple circuit configuration in the solid-state image pickup device in which the circuit, such as the transistor, necessary for the pixel structure is shared between the adjacent or near pixels in order to improve the pixel sensitivity.

Other Embodiments and Modifications

Although the sharing methods for the color filters, the readout channels, and the pixels included in the solid-state image pickup device are exemplified in the above embodiments of the present invention, the present invention is not limited to the exemplified embodiments. The present invention is applicable to other configurations within the scope of the present invention.

Figure 16A:
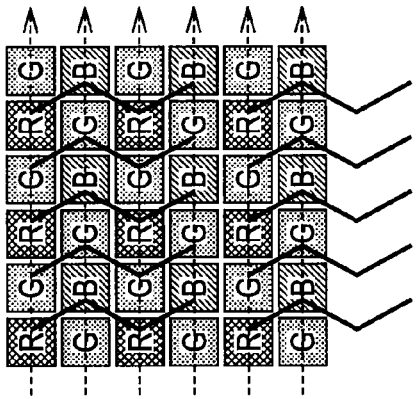
FIGS. 16A to 16C illustrate examples of the arrangement patterns of sharing pixels and the sharing pixel IDs in a solid-state image pickup device used in an image pickup apparatus according to another embodiment of the present invention.
Figure 16B:
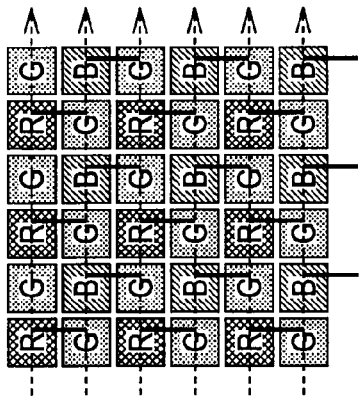
Figure 16C:
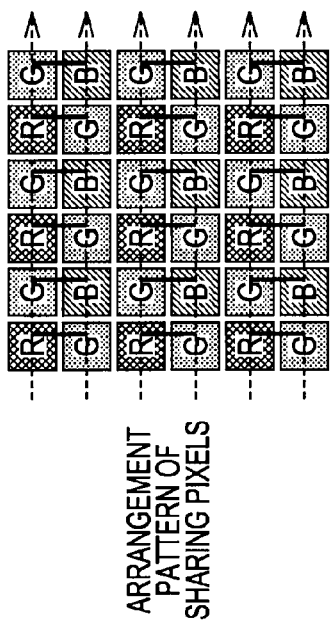

For example, when the color filters provided in the solid-state image pickup device are considered, the three exemplary arrangement patterns of the sharing pixels shown in FIGS. 4A to 4C have the sharing pixel IDs and the pixel output sequence represented by the sharing pixel IDs shown in FIGS. 16A to 16C.

The arrangement patterns of the sharing pixels shown in the upper lines in FIGS. 16A to 16C have the sharing pixel IDs shown in the medium lines therein and the pixel output sequences represented by the sharing pixel IDs shown in the lower lines therein.

In the examples in FIGS. 16A to 16C, the black level correction values and the linearity correction values corresponding to the sharing pixel IDs shown in the medium lines are detected and generated, and the correction is performed in synchronization with the pixel output sequence of the sharing pixel IDs shown in the lower lines.

Although the solid-state image pickup device is exemplified by the CMOS imager in the above embodiments of the present invention, the solid-state image pickup device may be a CCD imager.

The linearity correction table data Lct for every sharing pixel ID may be stored for every area, such as the central area or the peripheral area on the screen, instead of across one screen, and the pixel data read out from the corresponding area may be corrected for every sharing pixel ID by using the stored linearity correction table data Lct.

Similarly, the average black level for every sharing pixel ID may be detected and stored for every area, such as the central area or the peripheral area on the screen, and the black level of the pixel data read out from the corresponding area may be corrected for every sharing pixel ID by using the detected and stored average black level.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   a solid-state image pickup device including a plurality of pixels arranged in a two-dimensional array, a transistor necessary for each pixel being shared between not more than four of the pixels having a same arrangement pattern;
   correction value generating means for generating a linearity correction table including greater than two correction values for each pixel, each correction value corresponding to different signal levels of pixel data read out from the pixel position of each pixel having the same arrangement pattern, the correction values being used for correcting a nonuniformity in output linearity between pieces of pixel data output from each pixel at each of the plurality of different signal levels caused by a difference in position between the pixels in the arrangement pattern; and
   correcting means for correcting each pixel data read out from the solid-state image pickup device on the basis of the correction values for the corresponding pixel data, generated by the correction value generating means, wherein
   the correction value generating means generates first values for the pixel data read out from a pixel position of each pixel having the same arrangement pattern by calculating an average of black levels of the pixels arranged at a same position in the arrangement pattern in an area where a black level is detected in the solid-state image pickup device,
   the correction value generating means generates second values for the pixel data read out from the pixel position of each pixel having the same arrangement pattern by calculating an average of white levels of the pixels arranged at a same position in the arrangement pattern in an area where a white level is detected in the solid-state image pickup device, and
   the correction value generating means generates the linearity correction table including the greater than two correction values for each pixel based on the first and second values.

2. The image pickup apparatus according to claim 1, wherein
   the transistor necessary for each pixel is shared between not more than two of the pixels having a same arrangement pattern.

3. The image pickup apparatus of claim 2, wherein
   the transistor for each pixel is shared between two of the pixels that are adjacent to one another.

4. The image pickup apparatus according to claim 1, wherein
   the transistor necessary for each pixel is shared between four vertically arranged pixels in a zig-zag manner.

5. The image pickup apparatus according to claim 1, wherein
   the transistor necessary for each pixel is shared between four of the pixels having a same arrangement pattern.

6. A method of correcting captured image data read out from a solid-state image pickup device including a plurality of pixels arranged in a two-dimensional array, a transistor necessary for each pixel being shared between not more than four of the pixels having a same arrangement pattern, the method comprising:
   generating first values for pixel data read out from a pixel position of each pixel having the same arrangement pattern by calculating an average of black levels of pixels arranged at a same position in the arrangement pattern in an area where a black level is detected in the solid-state image pickup device;
   generating second values for pixel data read out from the pixel position of each pixel having the same arrangement pattern by calculating an average of white levels of the pixels arranged at a same position in the arrangement pattern in an area where a white level is detected in the solid-state image pickup device;
   generating a linearity correction table including greater than two correction values for each pixel based on the first and second values, each correction value corresponding to different signals levels of pixel data read out from the pixel position of each pixel having the same arrangement pattern, the correction values being used for correcting a nonuniformity in output linearity between pieces of pixel data output from each pixel at each of the plurality of different signal levels caused by a difference in position between the pixels in the arrangement pattern; and
   correcting each pixel data read out from the solid-state image pickup device on the basis of the generated correction values for the corresponding pixel data.

7. An image pickup apparatus comprising:
   a solid-state image pickup device including a plurality of pixels arranged in a two-dimensional array, a transistor necessary for each pixel being shared between not more than four of the pixels having a same arrangement pattern;
   a correction value generating unit that generates a linearity correction table including greater than two correction values for each pixel, each correction value corresponding to different signal levels of pixel data read out from a pixel position of each pixel having the same arrangement pattern, the correction values being used for correcting a nonuniformity in output linearity between pieces of pixel data output from each pixel at each of the plurality of different signal levels caused by a difference in position between the pixels in the arrangement pattern; and
   a correcting unit that corrects each pixel data read out from the solid-state image pickup device on the basis of the correction values for the corresponding pixel data, generated by the correction value generating unit, wherein
   the correction value generating unit generates first values for the pixel data read out from a pixel position of each pixel having the same arrangement pattern by calculating an average of black levels of the pixels arranged at a same position in the arrangement pattern in an area where a black level is detected in the solid-state image pickup device, the correction value generating unit generates second values for the pixel data read out from a pixel position of each pixel having the same arrangement pattern by calculating an average of white levels of the pixels arranged at the same position in the arrangement pattern in an area where a white level is detected in the solid-state image pickup device, and the correction value generating unit generates the linearity correction table including the greater than two correction values for each pixel based on the first and second values.

* * * * *